（12）United States Patent
Miyamoto et al.

(10) Patent No.: US 11,287,932 B2
(45) Date of Patent: Mar. 29, 2022

(54) STYLUS INCLUDING TWO RECEIVING/AMPLIFIER CIRCUITS FOR PROCESSING SIGNALS RECEIVED VIA TWO ELECTRODES AND INTEGRATED CIRCUIT FOR STYLUS

(71) Applicant: Wacom Co., Ltd., Saitama (JP)

(72) Inventors: Masayuki Miyamoto, Saitama (JP); Haruhiko Hisano, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/917,019

(22) Filed: Jun. 30, 2020

(65) Prior Publication Data

US 2021/0055828 A1 Feb. 25, 2021

(30) Foreign Application Priority Data

Aug. 23, 2019 (JP) .............................. JP2019-153149

(51) Int. Cl.
*G06F 3/044* (2006.01)
*G06F 3/041* (2006.01)
*G06F 3/0354* (2013.01)

(52) U.S. Cl.
CPC ........ *G06F 3/0441* (2019.05); *G06F 3/03545* (2013.01); *G06F 3/0418* (2013.01); *G06F 3/0448* (2019.05)

(58) Field of Classification Search
CPC ............................ G06F 3/0448; G06F 3/03545
See application file for complete search history.

(56) References Cited

U.S. PATENT DOCUMENTS

| 2013/0002603 | A1* | 1/2013 | Tada ....................... G06F 3/044 345/174 |
| 2015/0317009 | A1* | 11/2015 | Hara ..................... G06F 3/0442 345/173 |
| 2015/0365841 | A1* | 12/2015 | Wilhelmsson ...... H04W 36/165 370/252 |
| 2016/0188016 | A1* | 6/2016 | Munakata ............... G06F 3/046 345/179 |
| 2016/0246389 | A1* | 8/2016 | Munakata ........... G06F 3/03545 |
| 2017/0262084 | A1* | 9/2017 | Qiao ................... G06F 3/03545 |
| 2019/0146602 | A1* | 5/2019 | Kadowaki ........... G06F 3/03545 345/174 |

FOREIGN PATENT DOCUMENTS

JP 2019-91442 A 6/2019

* cited by examiner

*Primary Examiner* — Chun-Nan Lin
(74) *Attorney, Agent, or Firm* — Seed IP Law Group LLP

(57) ABSTRACT

A stylus is provided for use in conjunction with an electronic apparatus having a capacitance type touch sensor including a sensor electrode group disposed in a planar form. The stylus includes: a casing used to provide a reference potential; a first electrode; a second electrode different from the first electrode; a first receiving circuit grounded to the casing and configured to receive a transmission signal transmitted from the electronic apparatus via an electrostatic coupling formed between the first electrode and the sensor electrode group; a second receiving circuit grounded to the casing and configured to receive the transmission signal transmitted from the electronic apparatus via an electrostatic coupling formed between the second electrode and the sensor electrode group; and a control circuit configured to perform reception control of the first receiving circuit and the second receiving circuit.

10 Claims, 17 Drawing Sheets

STYLUS INCLUDING TWO RECEIVING/AMPLIFIER CIRCUITS FOR PROCESSING SIGNALS RECEIVED VIA TWO ELECTRODES AND INTEGRATED CIRCUIT FOR STYLUS

BACKGROUND

Technical Field

The present disclosure relates to a stylus used in conjunction with an electronic apparatus having a capacitance type touch sensor including a sensor electrode group disposed in a planar form, and an integrated circuit used to control the stylus.

Description of the Related Art

A position detecting system is known, which includes an active stylus (hereinafter referred to simply as a "stylus") as a position indicator of a type having a built-in power supply, and an electronic apparatus having a touch sensor. In this kind of system, signals are transmitted and received between the stylus and the electronic apparatus in order to exchange data or for the purpose of synchronize control. In the following, in order to distinguish two types of signals, a signal from the electronic apparatus will be referred to as an "uplink signal," and a signal from the stylus will be referred to as a "downlink signal."

The stylus receives the uplink signal via an electrostatic coupling formed between an electrode provided at a pen tip and a sensor electrode group forming a part of the touch sensor, and the stylus converts the uplink signal into a digital signal through a receiving circuit. The stylus thereby obtains data supplied from the electronic apparatus. When the human body of a user, for example, touches the touch surface of the electronic apparatus, an electrostatic coupling may be formed between the human body of the user and the sensor electrode group. The uplink signal induced in the human body may change the potential of the human body.

Specifically, assuming that [1] the reference potential of the stylus is set at the potential of a stylus casing, [2] the user is in a state of holding the stylus, and [3] the uplink signal is induced in the electrode of the stylus, in a case where [4] the uplink signal may be induced in a contacting portion of the human body, and [5] the relative positions and the attitude relationship between the electrode of the stylus and the contacting portion of the human body satisfy certain conditions, fluctuations of the reference potential may appear at a grounding terminal of the receiving circuit of the stylus to interfere with the detection operation of the uplink signal. As a result, the uplink signal induced in the electrode of the stylus may temporarily become undetectable due to the fluctuations of the reference potential.

FIGS. 18A and 18B are diagrams schematically illustrating a state in which the uplink signal temporarily become undetectable. More specifically, FIG. 18A shows a configuration of a receiving circuit 1, and FIG. 18B shows temporal changes in signal levels measured at nodes 4 and 5 in FIG. 18A.

As illustrated in FIG. 18A, a sample case is assumed in which an electrode 2 is connected to an input terminal of the receiving circuit 1, and a grounding terminal of the receiving circuit 1 is grounded (or ground-connected) to a casing 3. As is understood from FIG. 18B, a GND potential at node 5 remains at a substantially fixed signal level when the human body is not in contact with the touch surface (at the timing of reception of a first bit and a second bit). On the other hand, when the human body is in contact with the touch surface (at the timing of reception of a third bit and a fourth bit), the GND potential at node 5 varies in the signal level according to the waveform of the uplink signal at node 4. As a result, a phenomenon appears in which the third bit cannot be received correctly, hence the uplink signal cannot be detected.

Japanese Patent Laid-Open No. 2019-091442 discloses a sensor controller, which so controls the driving of the sensor electrode group to transmit a cancellation signal together with the uplink signal, wherein the cancellation signal is to suppress the appearance of the uplink signal at the grounding terminal of the receiving circuit of the stylus.

BRIEF SUMMARY

Japanese Patent Laid-Open No. 2019-091442 describes only the operation on the electronic apparatus side to address the above-described problem, and does not provide any solutions on the stylus side.

An aspect of the present disclosure is directed to providing a stylus and an integrated circuit, which can suppress the temporarily undetectable state of the signal induced in the electrode due to fluctuations of the reference potential caused by the signal induced in the human body.

According to one aspect of the present disclosure, a stylus is provided for use in conjunction with an electronic apparatus having a capacitance type touch sensor including a sensor electrode group disposed in a planar form. The stylus includes: a casing used to provide a reference potential; a first electrode; a second electrode different from the first electrode; and a first receiving circuit grounded to the casing. The first receiving circuit receives a transmission signal transmitted from the electronic apparatus via an electrostatic coupling formed between the first electrode and the sensor electrode group. The stylus also includes a second receiving circuit grounded to the casing. The second receiving circuit receives the transmission signal transmitted from the electronic apparatus via an electrostatic coupling formed between the second electrode and the sensor electrode group. The stylus further includes a control circuit configured to perform reception control of the first receiving circuit and the second receiving circuit.

According to another aspect of the present disclosure, an integrated circuit is provided to control operation of a stylus, wherein the stylus includes a casing used to provide a reference potential, a first electrode, and a second electrode different from the first electrode. The stylus is for use in conjunction with an electronic apparatus having a capacitance type touch sensor including a sensor electrode group disposed in a planar form. The integrated circuit includes a first receiving circuit grounded to the casing and configured to receive a transmission signal transmitted from the electronic apparatus via an electrostatic coupling formed between the first electrode and the sensor electrode group. The integrated circuit includes a second receiving circuit grounded to the casing and configured to receive the transmission signal transmitted from the electronic apparatus via an electrostatic coupling formed between the second electrode and the sensor electrode group. The integrated circuit includes a control circuit configured to perform reception control of the first receiving circuit and the second receiving circuit.

When the human body of a user, for example, touches the touch surface of the electronic apparatus, an electrostatic coupling may be formed between the human body and the sensor electrode group, and the transmission signal from the electronic apparatus may be induced in the contacting portion of the human body. According to the present disclosure, the first receiving circuit is provided to receive a signal induced in the first electrode, and the second receiving circuit is provided to receive a signal induced in the second electrode, wherein the relative positions and the attitude relationship between the first electrode and the contacting portion of the human body are different from the relative positions and the attitude relationship between the second electrode and the contacting portion of the human body. Thus, the transmission signal may be inputted respectively from the first electrode and the second electrode having different relative positions and attitude relationships with respect to the contacting portion of the body.

Because the first receiving circuit and the second receiving circuit are grounded to the casing providing a common reference potential, the effect of fluctuations of the reference potential caused by the signal induced in the human body on each of the first and second receiving circuits may be offset or shifted from each other spatially or temporally. Thus, even when a subtle balance change between the electrode of the stylus and the contacting portion of the human body causes one of the two receiving circuits to locally or suddenly malfunction, there is an increased possibility that the other one of the two receiving circuits functions properly as intended. Thus, it is possible to suppress the possibility that the signal induced in the electrode temporarily becomes undetectable due to the fluctuations of the reference potential.

According to another aspect of the present disclosure, a stylus is provided for use in conjunction with an electronic apparatus having a capacitance type touch sensor including a sensor electrode group disposed in a planar form. The stylus includes: a casing used to provide a reference potential; a first electrode; a second electrode different from the first electrode; and a receiving circuit configured to receive a transmission signal transmitted from the electronic apparatus via an electrostatic coupling formed between the first electrode and the sensor electrode group and an electrostatic coupling formed between the second electrode and the sensor electrode group. The receiving circuit includes a first amplifier circuit grounded to the casing and configured to amplify a signal induced in the first electrode, and a second amplifier circuit different from the first amplifier circuit. The second amplifier circuit is grounded to the casing and is configured to amplify a signal induced in the second electrode. The stylus includes a control circuit configured to perform reception control of the receiving circuit.

According to another aspect of the present disclosure, an integrated circuit is provided to control operation of a stylus, wherein the stylus includes a casing used to provide a reference potential, a first electrode, and a second electrode different from the first electrode. The stylus is for use in conjunction with an electronic apparatus having a capacitance type touch sensor including a sensor electrode group disposed in a planar form. The integrated circuit includes: a receiving circuit configured to receive a transmission signal transmitted from the electronic apparatus via an electrostatic coupling formed between the first electrode and the sensor electrode group and via an electrostatic coupling formed between the second electrode and the sensor electrode group. The receiving circuit includes a first amplifier circuit grounded to the casing and configured to amplify a signal induced in the first electrode, and a second amplifier circuit different from the first amplifier circuit. The second amplifier circuit is grounded to the casing and configured to amplify a signal induced in the second electrode. The integrated circuit includes a control circuit configured to perform reception control of the receiving circuit.

When the human body of a user, for example, touches the touch surface of the electronic apparatus, an electrostatic coupling may be formed between the human body and the sensor electrode group, and the transmission signal from the electronic apparatus may be induced in the contacting portion of the human body. According to the present disclosure, the first amplifier circuit configured to amplify the signal induced in the first electrode and the second amplifier circuit configured to amplify the signal induced in the second electrode are provided within the receiving circuit so that the transmission signal may be inputted respectively from the first electrode and the second electrode having different relative positions and attitude relationships with respect to the contacting portion of the human body.

Because the first amplifier circuit and the second amplifier circuit are grounded to the casing providing a common reference potential, the effect of fluctuations of the reference potential caused by the signal induced in the human body on each of the first and second amplifier circuits may be offset of shifted from each other spatially or temporally. Thus, even when a subtle balance change between the electrode of the stylus and the contacting portion of the human body causes one of the two amplifier circuits to locally or suddenly malfunction, there is an increased possibility that the other one of the two amplifier circuits functions properly as intended. Thus, it is possible to suppress the possibility that the signal induced in the electrode temporarily becomes undetectable due to the fluctuations of the reference potential.

The present disclosure provides solutions to suppress the temporarily undetectable state of the signal induced in the electrode due to fluctuations of the reference potential caused by the signal induced in the human body.

DETAILED DESCRIPTION

First Embodiment

A stylus and an integrated circuit according to a first embodiment of the present disclosure is described with reference to FIGS. 1 to 11.

General Configuration of Position Detecting System 10

Figure 1:
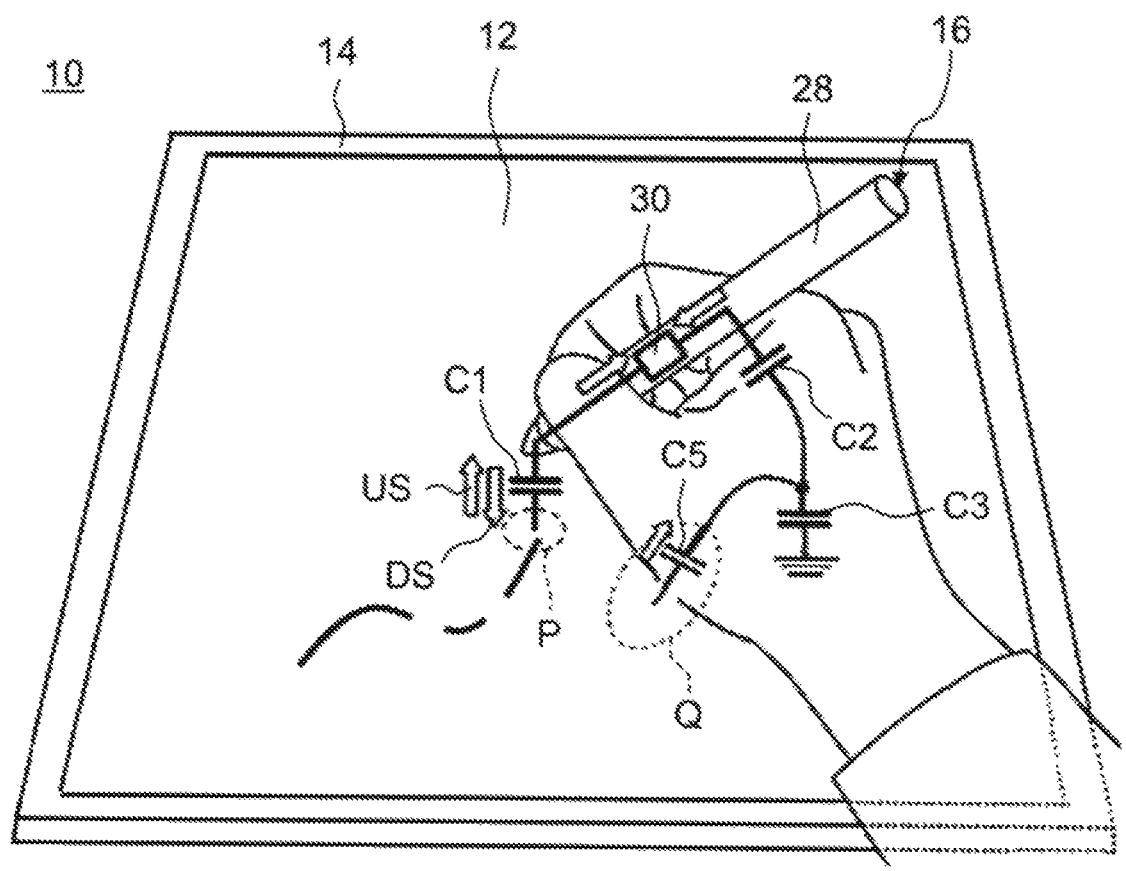
FIG. 1 is a general configuration diagram of a position detecting system incorporating a stylus according to a first embodiment of the present disclosure.

FIG. 1 is a general configuration diagram of a position detecting system 10 incorporating a stylus 16 according to the first embodiment of the present disclosure. The position detecting system 10 includes an electronic apparatus 14 having a touch detecting surface (hereinafter referred to as a touch surface 12) and the stylus 16 used in conjunction with the electronic apparatus 14.

The electronic apparatus 14 is formed by, for example, a tablet terminal, a smart phone, a personal computer, and so forth. A user can draw a picture or write characters on the electronic apparatus 14 by holding the stylus 16 with one hand and moving the stylus 16 while pressing a pen tip of the stylus 16 against the touch surface 12. The stylus 16 is a pen-type pointing device, and is configured to communicate bidirectionally with the electronic apparatus 14. In the following, a signal that the electronic apparatus 14 transmits to the stylus 16 will be referred to as an "uplink signal US," and a signal that the stylus 16 transmits to the electronic apparatus 14 will be referred to as a "downlink signal DS." The stylus 16 in the illustrated example is an "active type" electronic pen that actively generates a signal using electric energy stored in the stylus 16 itself, and transmits the generated signal as a downlink signal DS to the electronic apparatus 14.

Figure 2:
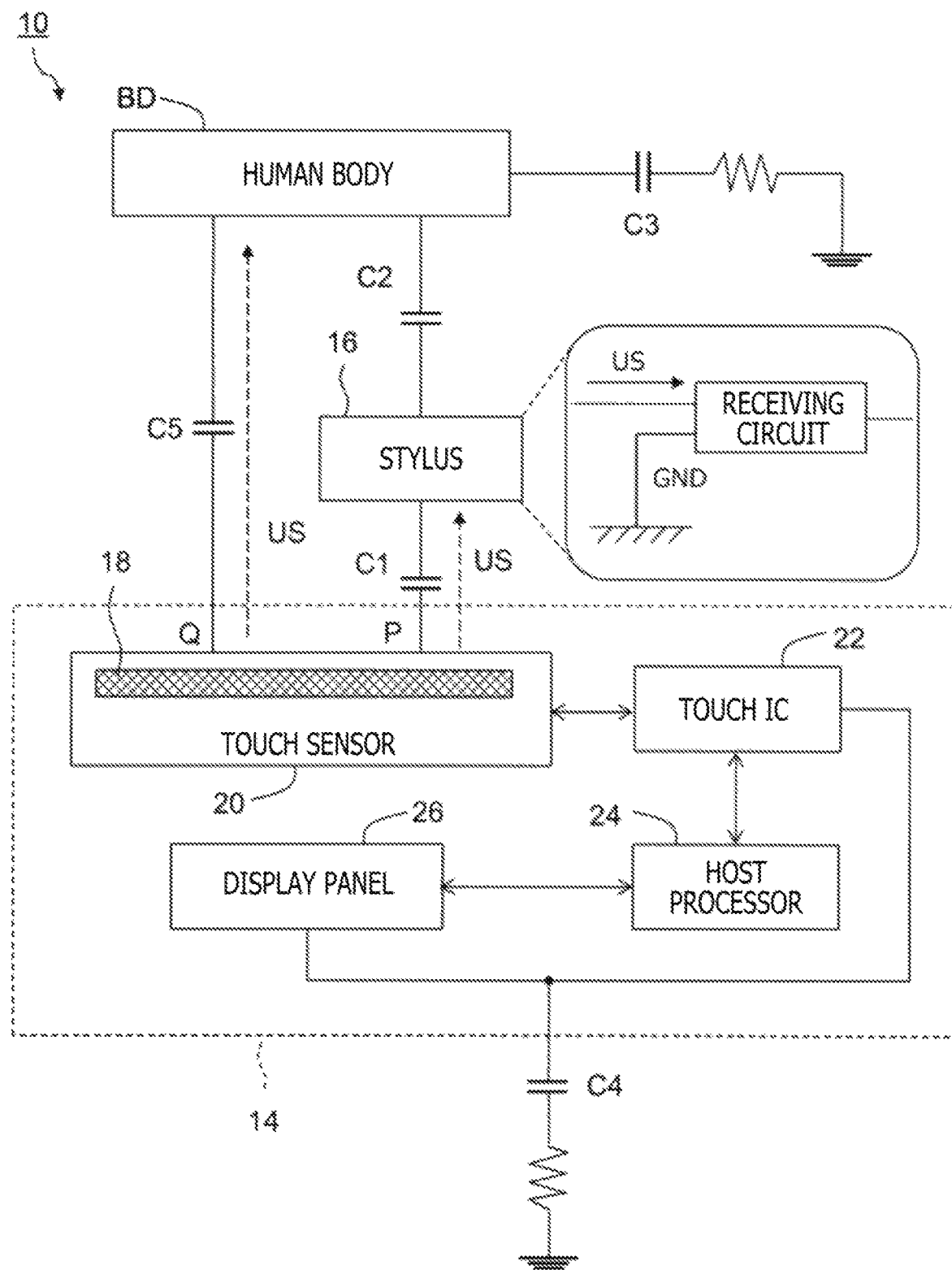
FIG. 2 is a schematic diagram of an electronic apparatus and the stylus illustrated in FIG. 1.

FIG. 2 is a schematic diagram of the electronic apparatus 14 and the stylus 16 illustrated in FIG. 1. The electronic apparatus 14 includes a touch sensor 20, a touch IC (Integrated Circuit) 22, a host processor 24, and a display panel 26.

The touch sensor 20 is a capacitance type sensor disposed to be superposed on the display panel 26. The touch sensor 20 may be a mutual capacitance type sensor, or may be a self-capacitance type sensor. The touch sensor 20 includes a sensor electrode group 18 arranged in a planar form, wherein the sensor electrodes forming the electrode group 18 are separated from each other along arrangement directions. The sensor electrodes may be formed of indium tin oxide (ITO), or may be formed of suitable metal, such as copper, silver, gold, or the like. In the example of FIG. 2, the touch sensor 20 is an "external type" sensor attached to the display panel 26 from the outside. Alternatively, the touch sensor 20 may be a sensor of a "built-in type" which is formed integrally with the display panel 26 (an on-cell type or an in-cell type, when further classified).

The touch IC 22 is an integrated circuit that performs driving control of the touch sensor 20. The touch IC 22 drives the touch sensor 20 based on a control signal supplied from the host processor 24. The touch IC 22 thereby performs a "pen detecting function" of detecting the state of the stylus 16 and a "touch detecting function" of detecting a touch by a finger of the user, for example.

The host processor 24 is formed by a processing computing device including a CPU (Central Processing Unit), an MPU (Micro-Processing Unit), a GPU (Graphics Processing Unit), or the like. The host processor 24 may perform various functions including generation and rendering of digital ink, generation of an image signal, and control of data transmission and data reception, by reading and executing a program stored in a memory (not illustrated).

The display panel 26 is formed, for example, by a liquid crystal panel, an organic EL (Electro Luminescence) panel, electronic paper, or the like. The display panel 26 drives a plurality of pixels by applying a driving voltage to signal lines in a matrix form, wherein the signal lines are arranged in a row direction and a column direction. The display panel 26 thereby displays an image or video within a display region.

Technical Issues

FIG. 2 is a diagram of an equivalent circuit illustrating a state in which a human body BD of the user is in contact with the touch surface 12 of the electronic apparatus 14. The following assumes that [1] a reference potential (hereinafter referred to also as a "GND potential") of the stylus 16 is set at the potential of a casing, [2] the user is in a state of holding the stylus 16, and [3] the uplink signal US is induced in electrodes of the stylus 16.

The electronic apparatus 14, the stylus 16, and the human body BD are electrically connected to each other via electrostatic coupling. The stylus 16 is electrically connected to the sensor electrode group 18 via a capacitance Cl formed at a position P directly below the electrode of a pen tip. The human body BD is grounded via a capacitance C3 formed between the GND potential of the stylus 16 and a ground. The touch IC 22 and the display panel 26 are commonly grounded via a capacitance C4 formed between the GND potential of the electronic apparatus 14 and the ground.

A grounding terminal of a receiving circuit of the stylus 16 is connected to the ground via the casing and the human body BD. Therefore, the receiving circuit can perform operation as intended, and can detect the uplink signal US from an input terminal. However, the human body BD may be electrically connected to the sensor electrode group 18 via a capacitance C5 formed at a position Q on the touch surface 12 when the human body BD (for example, a part of a hand holding the stylus 16) is in contact with the touch surface 12 of the electronic apparatus 14. That is, the uplink signal US induced in the human body BD might change the potential of the human body BD.

When the relative positions and the attitude relationship between the electrode of the stylus 16 and the contacting portion of the human body BD satisfy defined conditions, fluctuations of the GND potential may appear at the grounding terminal of the receiving circuit of the stylus 16 to interfere with the detection of the uplink signal US. As a result, the uplink signal US received via the electrode of the stylus 16 may temporarily become undetectable due to the fluctuations of the GND potential.

Figure 3:
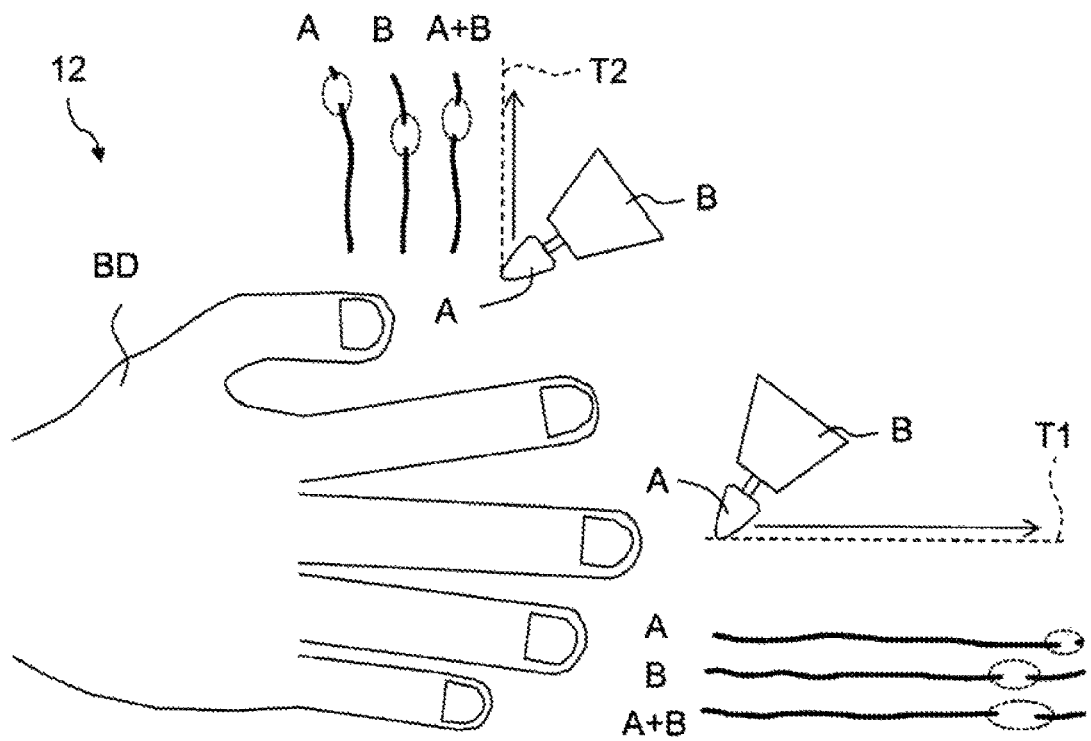
FIG. 3 is a diagram schematically illustrating a detection result of an uplink signal according to the position of the stylus.

FIG. 3 is a diagram schematically illustrating a detection result of the uplink signal US according to the position of the stylus 16. The following assumes a case where the user places the palm of the left hand (BD) in contact with the touch surface 12 and holds and moves the stylus 16 in the right hand along trajectories T1 and T2 adjacent to the left hand. The electronic apparatus 14 may display a stroke (a trajectory of an indicated position of the stylus 16) which follows the indicated position only when bidirectional communication between the electronic apparatus 14 and the stylus 16 is possible. That is, a continuous stroke can be drawn when the receiving circuit of the stylus 16 can continuously detect the uplink signal US.

The stylus 16 receives the uplink signal US by using three types of electrodes "A," "B," and "A+B." "A" denotes a tip electrode provided at the pen tip of the stylus 16. "B" denotes a ring electrode located on the rear (proximal) side of the pen tip. "A+B" corresponds to an integral electrode formed by electrically connecting the tip electrode and the ring electrode. For ease of illustration, drawing results of strokes using the three types of electrodes are indicated at positions shifted from each other in a vertical direction (for trajectory T1) or in a horizontal direction (for trajectory T2).

As is understood from FIG. 3, tendencies of occurrence of breaks in the strokes in the three types of drawing results (parts circled by broken lines) are similar to each other, but the positions and lengths of the breaks are different and do not exhibit regularity. This is because a triggering condition with regard to the relative positions and the attitude relationship is limited, and thus the uplink signal US may become locally and suddenly undetectable due to a subtle balance change between the electrode of the stylus 16 and the contacting portion of the human body BD.

The following describes a method capable of suppressing the temporarily undetectable state of the uplink signal US induced in the electrode due to the fluctuations of the GND potential caused by a signal induced in the human body BD, using a novel device configuration only on the side of the stylus 16.

Configuration of Stylus 16

Figure 4:
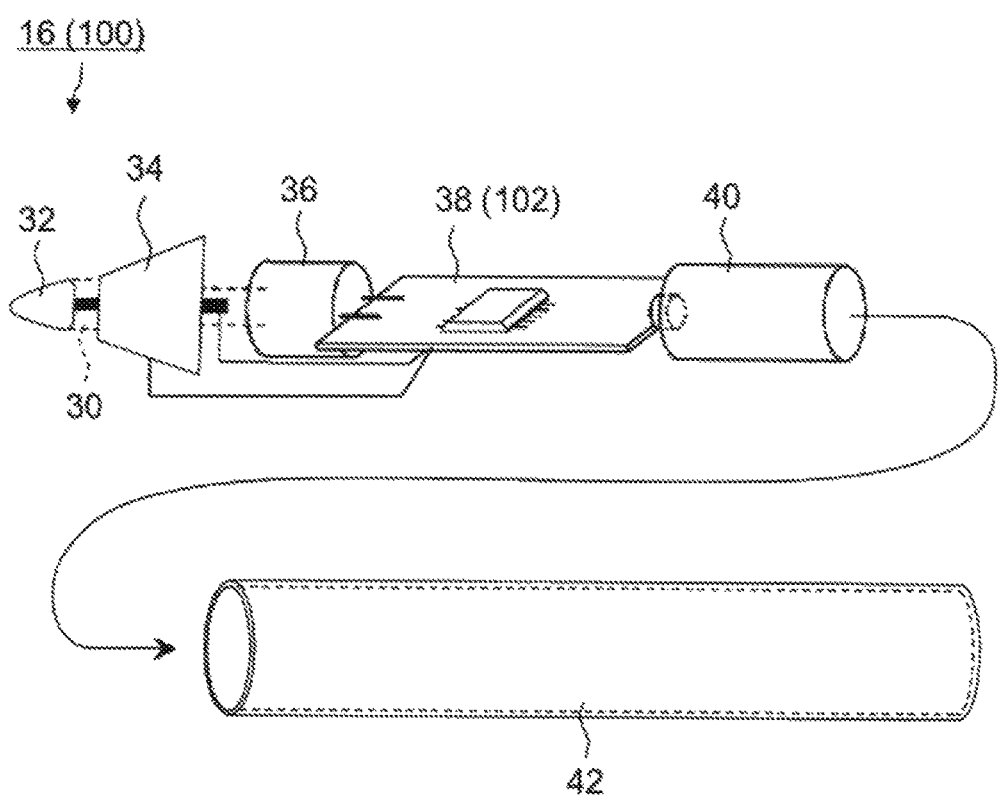
FIG. 4 is a diagram schematically illustrating an internal structure of the stylus of FIG. 1 and FIG. 2.

FIG. 4 is a diagram schematically illustrating an internal structure of the stylus 16 of FIG. 1 and FIG. 2. The stylus 16 includes a core 30, a tip electrode 32 (first electrode), a ring electrode 34 (second electrode), a pen pressure detection sensor 36, a circuit board 38 (integrated circuit), and a battery 40.

The core 30 is a rod-shaped member disposed along the pen axis of the stylus 16. Each of the tip electrode 32 and the ring electrode 34 is formed of a conductive material such as a metal or the like, or an electrode including a conductive material. In the illustrated example, the tip electrode 32 is a conical electrode attached to an end of the core 30. The ring electrode 34 is a tapered annular electrode gradually reduced in diameter toward the tip end side.

As illustrated in FIG. 4, the tip electrode 32 and the ring electrode 34, [1] are provided at the pen tip (the tip side of the casing 42), [2] have shapes different from each other, [3] have axial directions coinciding with each other, [4] are rotationally symmetric with respect to the pen axis, and [5] are arranged so as to be separated from each other in the pen axial direction. The shapes and arrangement of the tip electrode 32 and the ring electrode 34 are not limited to the example of FIG. 4, and may be changed appropriately as required.

The pen pressure detection sensor 36 is physically connected to the core 30, and is configured to be able to detect a pen pressure acting on the tip end side of the core 30. The pen pressure detection sensor 36 may be formed, for example, by a variable capacitance capacitor that changes its capacitance according to a pen pressure. The circuit board 38 is a board constituting an electric circuit to operate or control the stylus 16. The battery 40 is a power supply that supplies driving power to electronic parts or electronic elements arranged on the circuit board 38.

The stylus 16 includes a casing 42 that houses each of the constituent parts described above. The casing 42 in a tubular shape is formed of a conductive material such as a metal or the like, or includes a conductive material. When the user uses the stylus 16, the user holds the stylus 16 while touching the outer circumferential surface of the casing 42. The human body BD is thereby electrically connected to the stylus 16 via a capacitance formed at the contacting portion of the casing 42.

Figure 5:
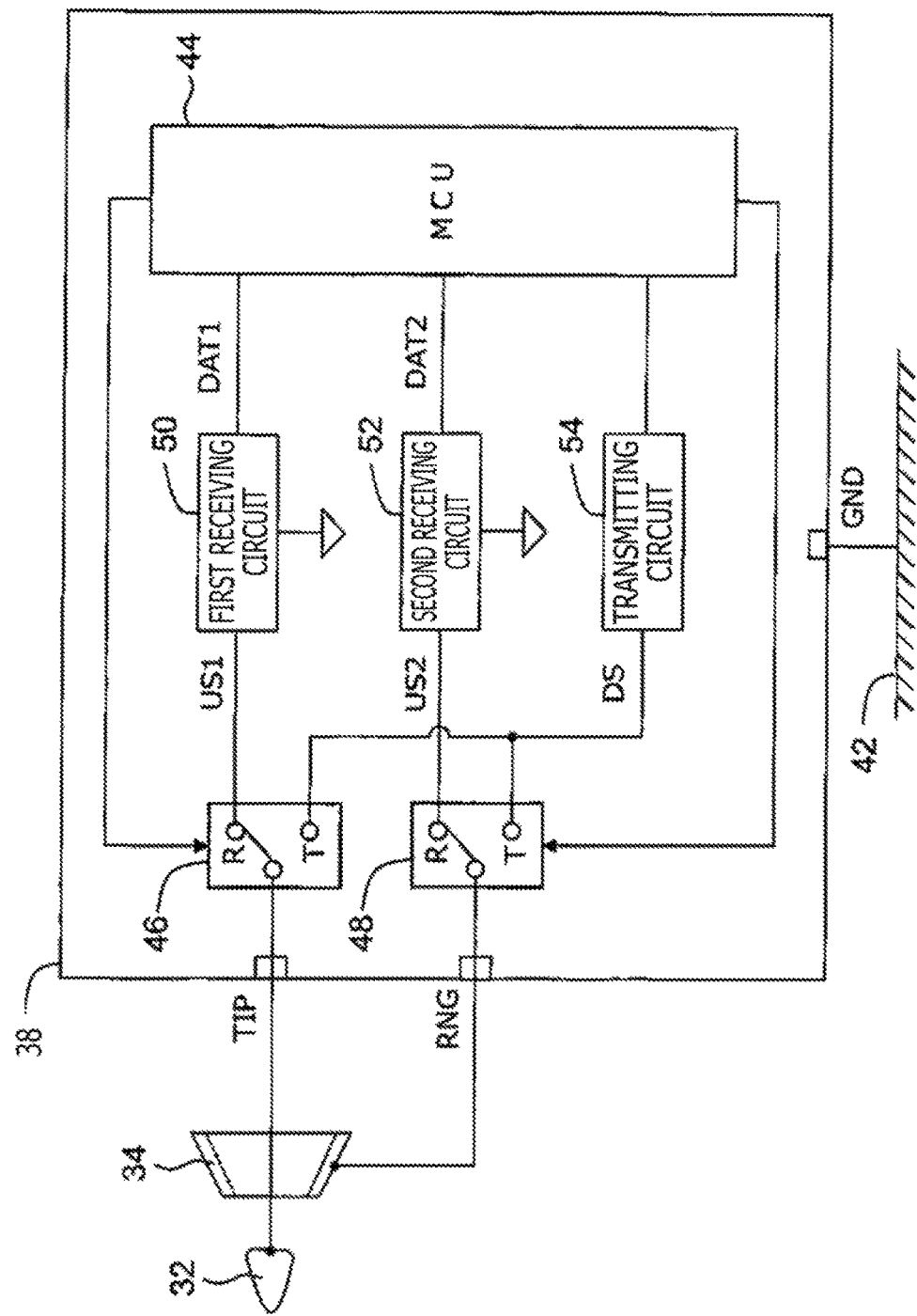
FIG. 5 is a block diagram of a circuit board illustrated in FIG. 4.

FIG. 5 is a block diagram of the circuit board 38 illustrated in FIG. 4. The circuit board 38 includes a microcontrol unit (hereinafter an MCU 44; a control circuit), a first switch 46, a second switch 48, a first receiving circuit 50, a second receiving circuit 52, and a transmitting circuit 54.

The MCU 44 is a unit that performs centralized control of each part of the stylus 16. The MCU 44 is configured to be able to receive uplink signals US1 and US2 from the electronic apparatus 14 by performing desired reception control of the first receiving circuit 50 and the second receiving circuit 52. In addition, the MCU 44 is configured to be able to transmit the downlink signal DS to the electronic apparatus 14 by performing desired transmission control of the transmitting circuit 54.

The first switch 46 is a switch element configured such that a common terminal is connected to one of an R-terminal and a T-terminal. The common terminal of the first switch 46 is connected to the tip electrode 32. The R-terminal of the first switch 46 is connected to an input terminal of the first receiving circuit 50. The T-terminal of the first switch 46 is connected to an output terminal of the transmitting circuit 54. The MCU 44 performs switching control of the first switch 46, to thereby selectively perform the reception of the uplink signal US1 and the transmission of the downlink signal DS.

The second switch 48 is a switch element configured such that a common terminal is connected to one of an R-terminal and a T-terminal. The common terminal of the second switch 48 is connected to the ring electrode 34. The R-terminal of the second switch 48 is connected to an input terminal of the second receiving circuit 52. The T-terminal of the second switch 48 is connected to the output terminal of the transmitting circuit 54. The MCU 44 performs switching control of the second switch 48, to thereby selectively perform the reception of the uplink signal US2 and the transmission of the downlink signal DS.

The first receiving circuit 50 is a circuit that demodulates the uplink signal US1 induced in the tip electrode 32, and outputs data after demodulation (hereinafter first data DAT1) to the MCU 44. Here, a grounding terminal of the first receiving circuit 50 is ground-connected (or grounded) to the casing 42 of the stylus 16.

The second receiving circuit 52 is a circuit that demodulates the uplink signal US2 induced in the ring electrode 34, and outputs data after demodulation (hereinafter second data DAT2) to the MCU 44. Here, a grounding terminal of the second receiving circuit 52 is ground-connected (or grounded) to the casing 42 of the stylus 16.

The MCU 44 obtains control data from the electronic apparatus 14 by performing data processing of at least one of the first data DAT1 and the second data DAT2. For example, while the MCU 44 can obtain the first data DAT1 from the first receiving circuit 50, the MCU 44 may perform data processing of the first data DAT1 to obtain control data, whereas while the MCU 44 cannot obtain the first data DAT1 from the first receiving circuit 50, the MCU 44 may perform data processing of the second data DAT2 obtained from the second receiving circuit 52 to obtain control data.

The transmitting circuit 54 is a circuit that generates the downlink signal DS according to control by the MCU 44. The transmitting circuit 54 outputs a carrier signal in an unmodulated state in a case where the downlink signal DS is a "position signal," and modulates the carrier signal using data for transmission and outputs the modulated carrier signal in a case where the downlink signal DS is a "data signal."

Figure 6:
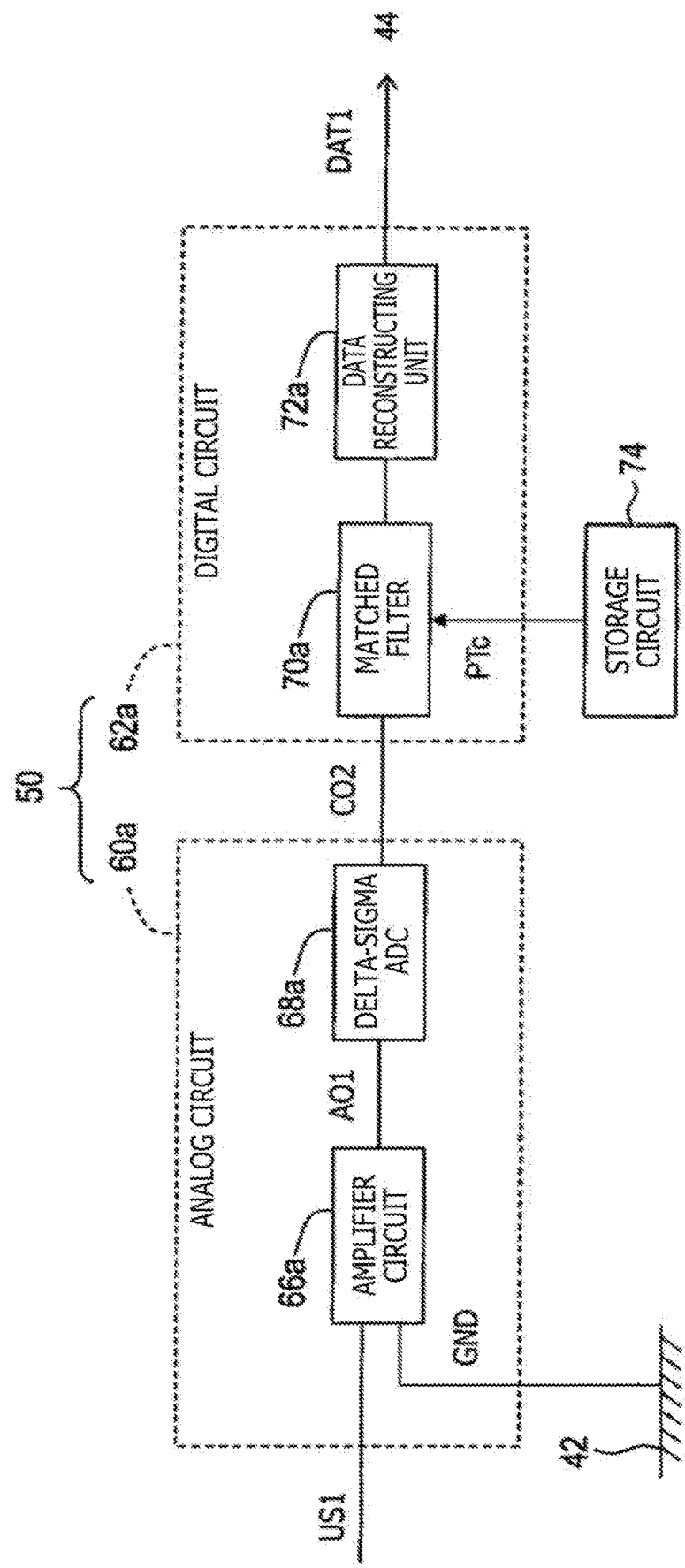
FIG. 6 is a diagram illustrating a configuration of a first receiving circuit in FIG. 5.
Figure 7:
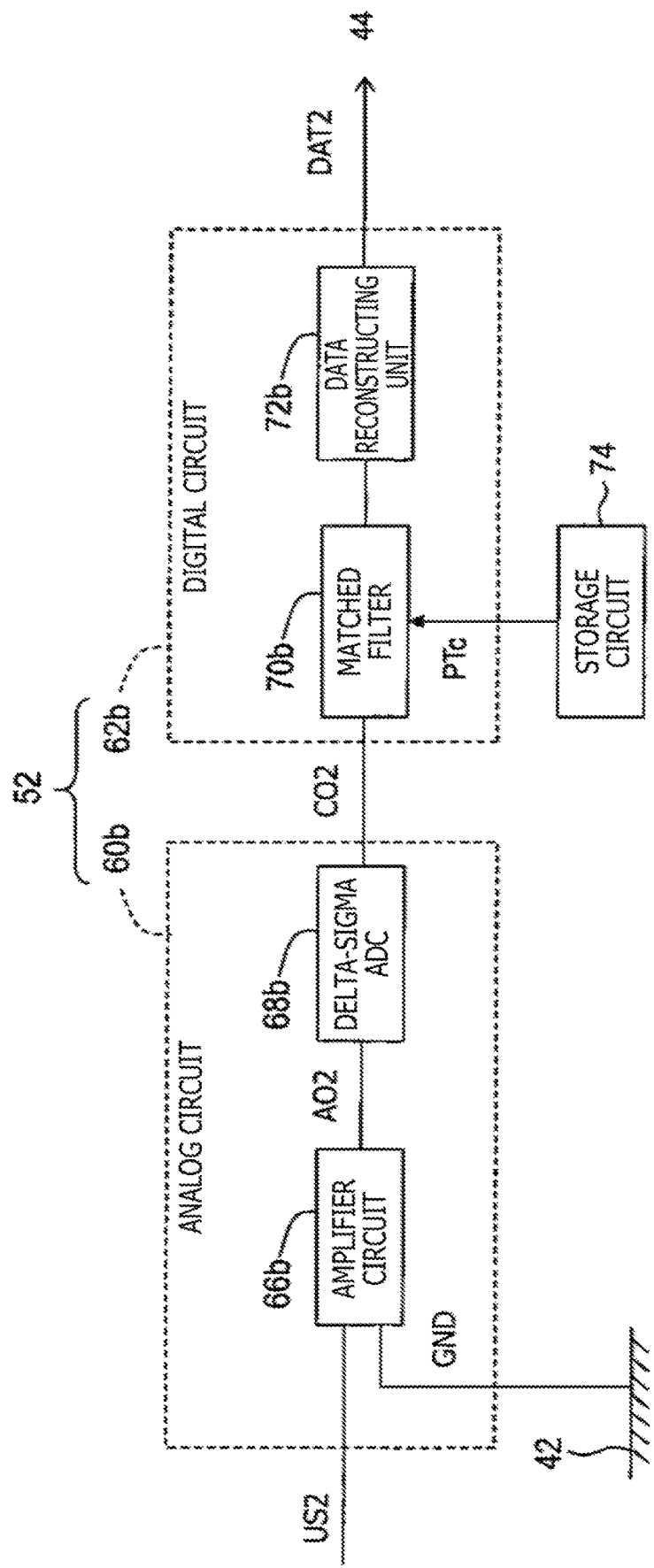
FIG. 7 is a diagram illustrating a configuration of a second receiving circuit in FIG. 5.

FIG. 6 is a diagram illustrating a sample configuration of the first receiving circuit 50 in FIG. 5. FIG. 7 is a diagram illustrating a sample configuration of the second receiving circuit 52 in FIG. 5. As is understood from FIG. 6 and FIG. 7, in the present embodiment, the second receiving circuit 52 has a configuration similar to that of the first receiving circuit 50.

As illustrated in FIG. 6, the first receiving circuit 50 is formed by connecting an analog circuit 60a, and a digital circuit 62a (first detecting circuit), in series with each other. The analog circuit 60a includes an amplifier circuit 66a (first amplifier circuit) and a delta-sigma AD converting circuit (hereinafter a delta-sigma ADC 68a). The digital circuit 62a includes a matched filter 70a and a data reconstructing unit 72a.

As illustrated in FIG. 7, the second receiving circuit 52 is formed by connecting an analog circuit 60b, and a digital circuit 62b (second detecting circuit), in series with each other. The analog circuit 60b includes an amplifier circuit 66b (second amplifier circuit) and a delta-sigma ADC 68b. The digital circuit 62b includes a matched filter 70b and a data reconstructing unit 72b.

The amplifier circuit 66a is a circuit that amplifies the uplink signal US1 induced in the tip electrode 32. The amplifier circuit 66a has an input terminal connected to the R-terminal of the first switch 46, and has a grounding terminal connected to the casing 42. The amplifier circuit 66b is a circuit that amplifies the uplink signal US2 induced in the ring electrode 34. The amplifier circuit 66b has an input terminal connected to the R-terminal of the second switch 48, and has a grounding terminal connected to the casing 42. The amplification factor of the amplifier circuit 66a is preferably equal to the amplification factor of the amplifier circuit 66b, but may be different from the amplification factor of the amplifier circuit 66b. While the amplifier circuit 66a is directly connected to the casing 42 in the example of FIG. 6, the amplifier circuit 66a may be indirectly connected to the casing 42 via a conductive member, which is not illustrated. The same is true for the amplifier circuit 66b in FIG. 7.

The delta-sigma ADC 68a is a circuit that outputs a binary, ternary, or multivalued signal by subjecting an output signal AO1 of the amplifier circuit 66a to AD conversion of a delta-sigma type. The delta-sigma ADC 68b is a circuit that outputs a binary, ternary, or multivalued signal by subjecting an output signal AO2 of the amplifier circuit 66b to AD conversion of a delta-sigma type. The "delta-sigma type" refers to an AD converting method that integrates ($\Sigma$) a difference ($\Delta$) between a sampled voltage and an output voltage using an integrator, and converts the resulting integrated value into a pulse train by comparing the magnitude of the integrated value with the magnitude of a reference voltage.

The matched filter 70a detects a data signal corresponding to the uplink signal US1 by performing correlation operation between an output signal CO1 of the delta-sigma ADC 68a and a comparison pattern PTc read from a storage circuit 74. The matched filter 70b detects a data signal corresponding to the uplink signal US2 by performing correlation operation between an output signal CO2 of the delta-sigma ADC 68b and the comparison pattern PTc read from the storage circuit 74. Here, the "correlation operation" is an operation that calculates a correlation value between a successively supplied chip sequence and each of known comparison patterns PTc (an array of spread codes corresponding to the uplink signal US in this case), and detects and outputs a bit when the correlation value exhibits a peak.

The data reconstructing unit 72a has a function of reconstructing the data signal detected by the matched filter 70a according to a known rule, and outputting the first data DAT1. The data reconstructing unit 72b has a function of reconstructing the data signal detected by the matched filter 70b according to a known rule, and outputting the second data DAT2.

Figure 8:
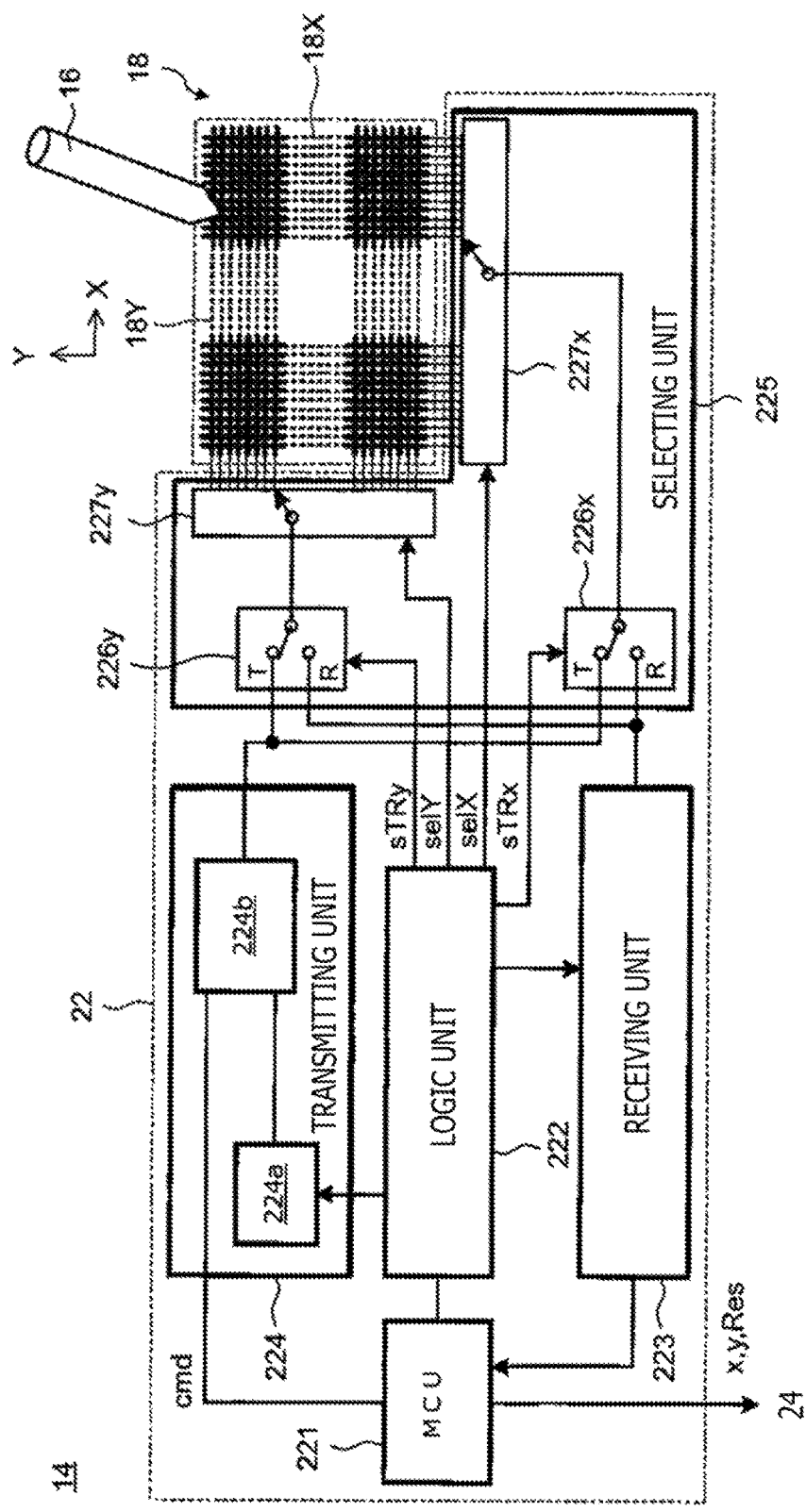
FIG. 8 is a diagram illustrating a sample circuit configuration in a touch IC of FIG. 1 and FIG. 2.

The storage circuit 74 stores each of patterns indicating an original waveform (0/1 binary patterns in this case) as the comparison pattern PTc for a plurality of spread codes that may be used for the transmission of the uplink signal US by the touch IC 22 (FIG. 8).

Thus, the first receiving circuit 50 includes the digital circuit 62a (first detecting circuit) that detects the first data DAT1 indicated by the uplink signal US by performing correlation operation between the output signal CO1 (first processed signal), which is obtained by processing the output signal AO1 (first amplified signal) of the amplifier circuit 66a, and the comparison pattern PTc corresponding to the uplink signal US. In addition, the second receiving circuit 52 includes the digital circuit 62b (second detecting circuit) that detects the second data DAT2 indicated by the uplink signal US by performing correlation operation between the output signal CO2 (second processed signal), which is obtained by processing the output signal AO2 (second amplified signal) of the amplifier circuit 66b, and the comparison pattern PTc corresponding to the uplink signal US. In this case, the MCU 44 may obtain the first data DAT1 from the first receiving circuit 50, and may obtain the second data DAT2 from the second receiving circuit 52.

Alternatively, the digital circuit 62a may perform correlation operation between the output signal AO1 of the amplifier circuit 66a and the comparison pattern PTc, and the digital circuit 62b may perform correlation operation between the output signal AO2 of the amplifier circuit 66b and the comparison pattern PTc.

Configuration of Touch IC 22

FIG. 8 is a diagram illustrating an example of a circuit configuration of the touch IC 22 of FIG. 1 and FIG. 2. The touch IC 22 is connected to the sensor electrode group 18 (FIG. 2), and includes an MCU 221, a logic unit 222, a receiving unit 223, a transmitting unit 224, and a selecting unit 225.

The sensor electrode group 18 includes a plurality of sensor electrodes 18X for detecting a position in an X-direction (X-coordinate) and a plurality of sensor electrodes 18Y for detecting a position in a Y-direction (Y-coordinate). The sensor electrodes 18X and 18Y are each insulated by the intervention of an insulative substrate (not illustrated) formed of a glass or a resin. The plurality of sensor electrodes 18X are provided to extend in the Y-direction, and are arranged at equal intervals while separated from each other along the X-direction. The plurality of sensor electrodes 18Y are provided to extend in the X-direction, and are arranged at equal intervals while separated from each other along the Y-direction.

The MCU 221 and the logic unit 222 control transmitting and receiving operation of the touch IC 22 by controlling the receiving unit 223, the transmitting unit 224, and the selecting unit 225. The MCU 221 is a control unit that reads a program from a memory included in the MCU 221, and executes the program. The logic unit 222 is configured to generate control signals for the receiving unit 223, the transmitting unit 224, and the selecting unit 225 according to control by the MCU 221.

The MCU 221 has a function of selectively performing control of receiving the downlink signal DS from the stylus 16 and control of transmitting the uplink signal US to the stylus 16. When the MCU 221 transmits the uplink signal US, the MCU 221 generates a command cmd for the stylus 16, and supplies the command cmd to the transmitting unit 224.

The receiving unit 223 has a function of receiving the downlink signal DS, which is transmitted from the stylus 16, according to the control signal supplied from the logic unit 222. Specifically, the receiving unit 223 subjects a signal supplied from the selecting unit 225 to decoding processing, and supplies the resulting digital signal as a received signal to the MCU 221.

When the downlink signal DS is a "position signal" indicating the position of the stylus 16, the MCU 221 calculates the position coordinates (x, y) of the stylus 16 on the touch surface 12 from a reception strength at each of the plurality of sensor electrodes 18X and 18Y, and outputs the position coordinates (x, y) of the stylus 16 to the host processor 24. When the downlink signal DS is a "data signal" including transmission data, on the other hand, the MCU 221 obtains response data Res (for example, a unique ID, a pen pressure, pen switch on-off information, and the like) included in the data signal, and outputs the response data Res to the host processor 24.

The transmitting unit 224 has a function of generating the uplink signal US according to control of the MCU 221 and the logic unit 222. Specifically, the transmitting unit 224 includes a code string retaining section 224a and a spread processing section 224b.

The code string retaining section 224a has a function of generating and retaining spectrum spread codes (hereinafter also referred to simply as "spread codes") having a self-correlation characteristic on the basis of the control signal supplied from the logic unit 222. The code string retaining section 224a is configured to be able to generate and store spread codes different for respective contents of the transmission data ("P," "0000," "0001," and the like).

Figure 9:
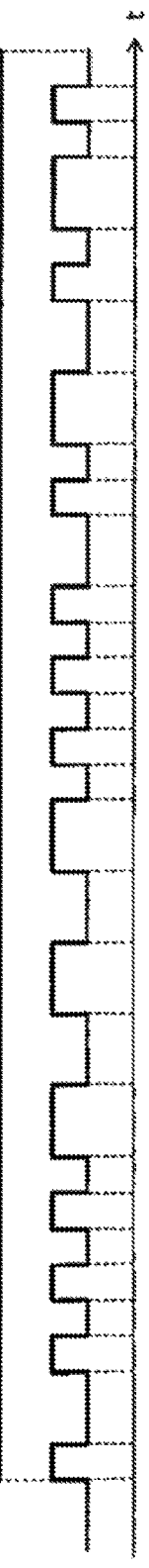
FIG. 9 is a diagram illustrating an example of the uplink signal.

The spread processing section 224b has a function of generating a desired alternating-current signal (for example, a pulse signal, a triangular wave signal, a sinusoidal signal, or the like) based on the command cmd supplied from the MCU 221. As illustrated in FIG. 9, first, the spread processing section 224b generates the uplink signal US from the input command cmd. In the example of FIG. 9, the uplink signal US is constituted of two preambles "P," data "D1, D2, D3" each having one byte, and an error detection signal "CRC."

The spread processing section 224b generates a binary chip sequence by replacing each of the plurality of pieces of transmission data constituting the uplink signal US with spread codes retained by the code string retaining section 224a, and thereafter performing Manchester coding processing. The spread processing section 224b then generates a pulse signal corresponding to the chip sequence.

Returning to FIG. 8, the selecting unit 225 is connected to the sensor electrode group 18, and performs switch operation according to the control signal from the logic unit 222. Specifically, the selecting unit 225 includes two switches 226x and 226y and two electrode selecting circuits 227x and 227y.

The switches 226x and 226y are each a switch element configured such that a common terminal is connected to one of a T-terminal and an R-terminal. The common terminal of the switch 226x is connected to the electrode selecting circuit 227x. The T-terminal of the switch 226x is connected to an output terminal of the transmitting unit 224. The R-terminal of the switch 226x is connected to an input terminal of the receiving unit 223. The common terminal of the switch 226y is connected to the electrode selecting circuit 227y. The T-terminal of the switch 226y is connected to the output terminal of the transmitting unit 224. The R-terminal of the switch 226y is connected to the input terminal of the receiving unit 223.

The electrode selecting circuit 227x is a switch element for selectively connecting the plurality of sensor electrodes 18X to the common terminal of the switch 226x. That is, the electrode selecting circuit 227x is configured to be able to connect at least a part of the plurality of sensor electrodes 18X to the common terminal of the switch 226x simultaneously. The electrode selecting circuit 227y is a switch element for selectively connecting the plurality of sensor electrodes 18Y to the common terminal of the switch 226y. That is, the electrode selecting circuit 227y is configured to be able to connect at least a part of the plurality of sensor electrodes 18Y to the common terminal of the switch 226y simultaneously.

The selecting unit 225 is supplied with four control signals sTRx, sTRy, selX, and selY from the logic unit 222. Specifically, the control signal sTRx is supplied to the switch 226x, the control signal sTRy is supplied to the switch 226y, the control signal selX is supplied to the electrode selecting circuit 227x, and the control signal selY is supplied to the electrode selecting circuit 227y. The logic unit 222 performs switching control of the selecting unit 225 through the four control signals sTRx, sTRy, selX, and selY. The transmission of the uplink signal US and the reception of the downlink signal DS are thus performed selectively.

Effects of First Embodiment

In the embodiment described above, the stylus 16 is a device used in conjunction with the electronic apparatus 14 including the capacitance type touch sensor 20 including the sensor electrode group 18 disposed in a planar form. The stylus 16 includes: the casing 42 used as providing the reference potential; the tip electrode 32 (first electrode); the ring electrode 34 (second electrode) different from the tip electrode 32; the first receiving circuit 50 grounded to the casing 42 and configured to receive the uplink signal US1 (transmission signal) transmitted from the electronic apparatus 14 via an electrostatic coupling formed between the tip electrode 32 and the sensor electrode group 18; the second receiving circuit 52 grounded to the casing 42 and configured to receive the uplink signal US2 (transmission signal) transmitted from the electronic apparatus 14 via an electrostatic coupling formed between the ring electrode 34 and the sensor electrode group 18; and the MCU 44 (control circuit) configured to perform reception control of the first receiving circuit 50 and the second receiving circuit 52.

When the human body BD of the user, for example, touches the touch surface 12 of the electronic apparatus 14, an electrostatic coupling may be formed between the human body BD and the sensor electrode group 18, and the uplink signal US from the electronic apparatus 14 may be induced in the contacting portion of the human body BD. According to the present disclosure, the first receiving circuit 50 is provided to receive the uplink signal US1 induced in the tip electrode 32 and the second receiving circuit 52 is provided to receive the uplink signal US2 induced in the ring electrode 34. Thus, the transmission signal is inputted respectively from the two electrodes having different relative positions and attitude relationships with respect to the contacting portion of the human body BD. Because the first receiving circuit 50 and the second receiving circuit 52 are grounded to the casing 42 providing the common GND potential, the effect of fluctuations of the GND potential caused by the signal induced in the human body BD on each of the two receiving circuits may be offset of shifted from each other spatially or temporally.

Figure 10:
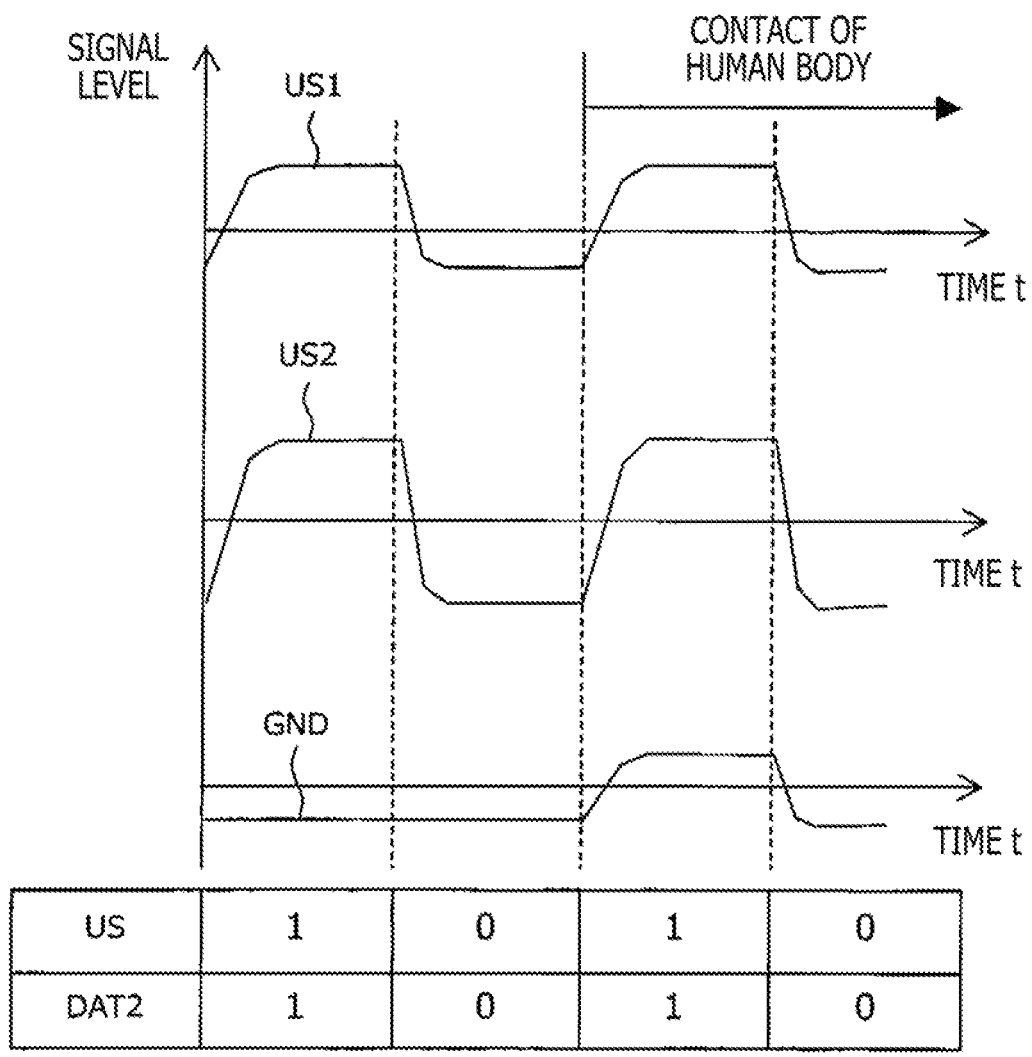
FIG. 10 is a diagram schematically illustrating effects of the first embodiment.
Figure 11:
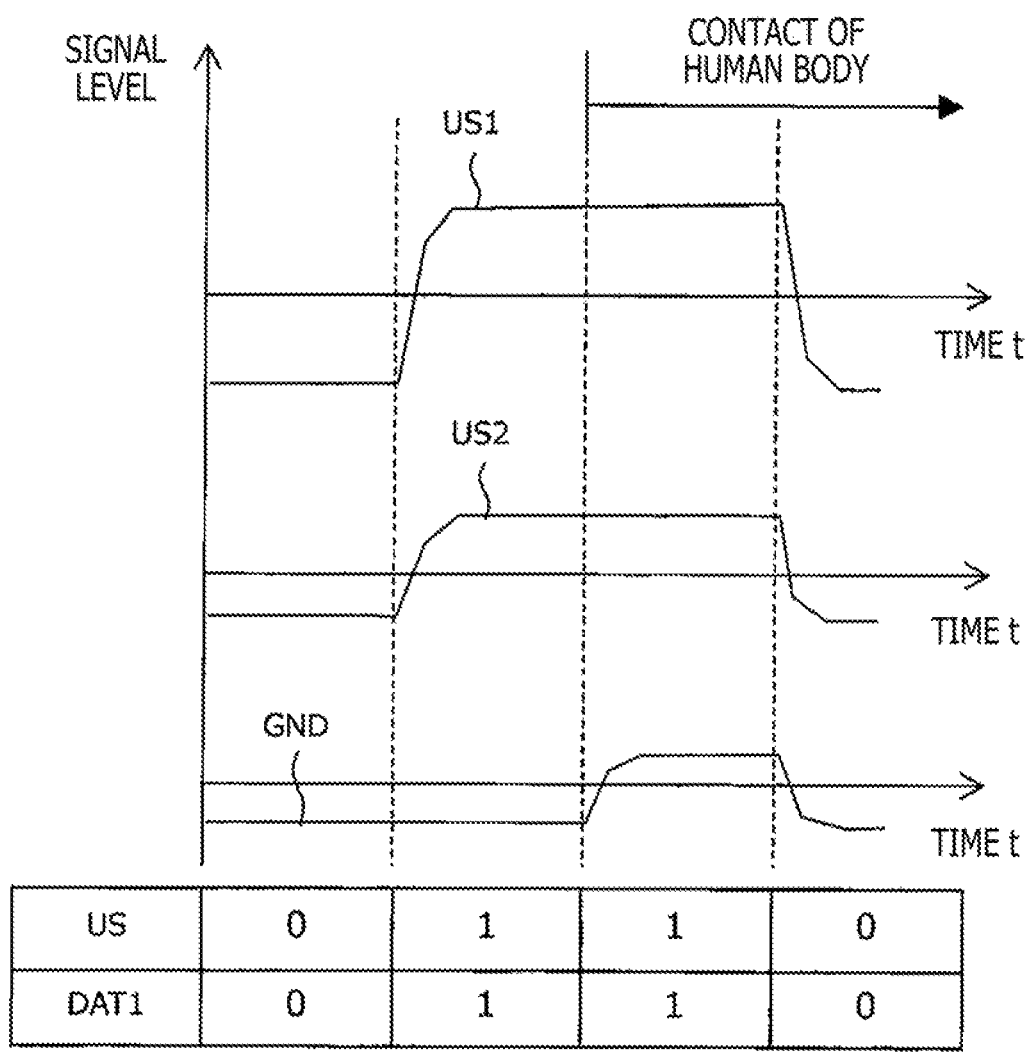
FIG. 11 is a diagram schematically illustrating effects of the first embodiment.

As illustrated in FIG. 10, the GND potential of the casing 42 varies in signal level according to the waveform of the uplink signal US when the human body BD is in contact with the touch surface 12 (at the timing of reception of a third bit and a fourth bit). Then, the first receiving circuit 50 may become unable to detect the uplink signal US1 (first data DAT1) correctly, but the second receiving circuit 52 may still detect the uplink signal US2 (second data DAT2) correctly. Alternatively, as illustrated in FIG. 11, the second receiving circuit 52 may become unable to detect the uplink signal US2 (second data DAT2) correctly, but the first receiving circuit 50 may still detect the uplink signal US1 (first data DAT1) correctly.

Thus, even when one receiving circuit should malfunction locally and suddenly due to a subtle balance change between the electrode of the stylus 16 and the contacting portion of the human body BD, there is an increased possibility that the other receiving circuit functions properly as intended. Thus, it is possible to suppress the possibility that the signal induced in the electrode temporarily becomes undetectable due to the fluctuations of the GND potential.

The first receiving circuit 50 may include the amplifier circuit 66a (first amplifier circuit) grounded to the casing 42 and configured to amplify the signal induced in the tip electrode 32, and the second receiving circuit 52 may include the amplifier circuit 66b (second amplifier circuit) grounded to the casing 42 and configured to amplify the signal induced in the ring electrode 34. The operation of the amplifier circuits 66a and 66b tends to be more substantially affected by the fluctuations of the GND potential. Therefore, the suppressing effect of the present disclosure described above (to suppress the possibility that the signal induced in the stylus electrode temporarily becomes undetectable) becomes correspondingly more noticeable with the embodiment including the amplifier circuits 66a and 66b.

The tip electrode 32 and the ring electrode 34 may be arranged at the end side of the casing 42, and have shapes different from each other. This makes it easier to cause the uplink signals US1 and US2 induced at the two electrodes 32 and 34 to have different waveforms from each other when the end side of the casing 42 (that is, the stylus 16) having the two electrodes 32 and 34 is directed to the electronic apparatus 14. This further decreases the possibility that the uplink signals US1 and US2 both become undetectable at the same time.

The tip electrode 32 and the ring electrode 34 may be arranged to be separated from each other in the direction of the pen axis. This makes it easier to cause the uplink signals US1 and US2 received from the sensor electrode group 18 by the two electrodes 32 and 34 to have different reception strengths when the stylus 16 is directed to the electronic apparatus 14. This further decreases the possibility that the uplink signals US1 and US2 both become undetectable at the same time.

Second Embodiment

A stylus and an integrated circuit according to a second embodiment of the present disclosure will next be described with reference to FIGS. 12 to 16. Configurations or functions similar to those of the first embodiment are identified by the same reference numerals, and description thereof may be omitted.

Figure 12:
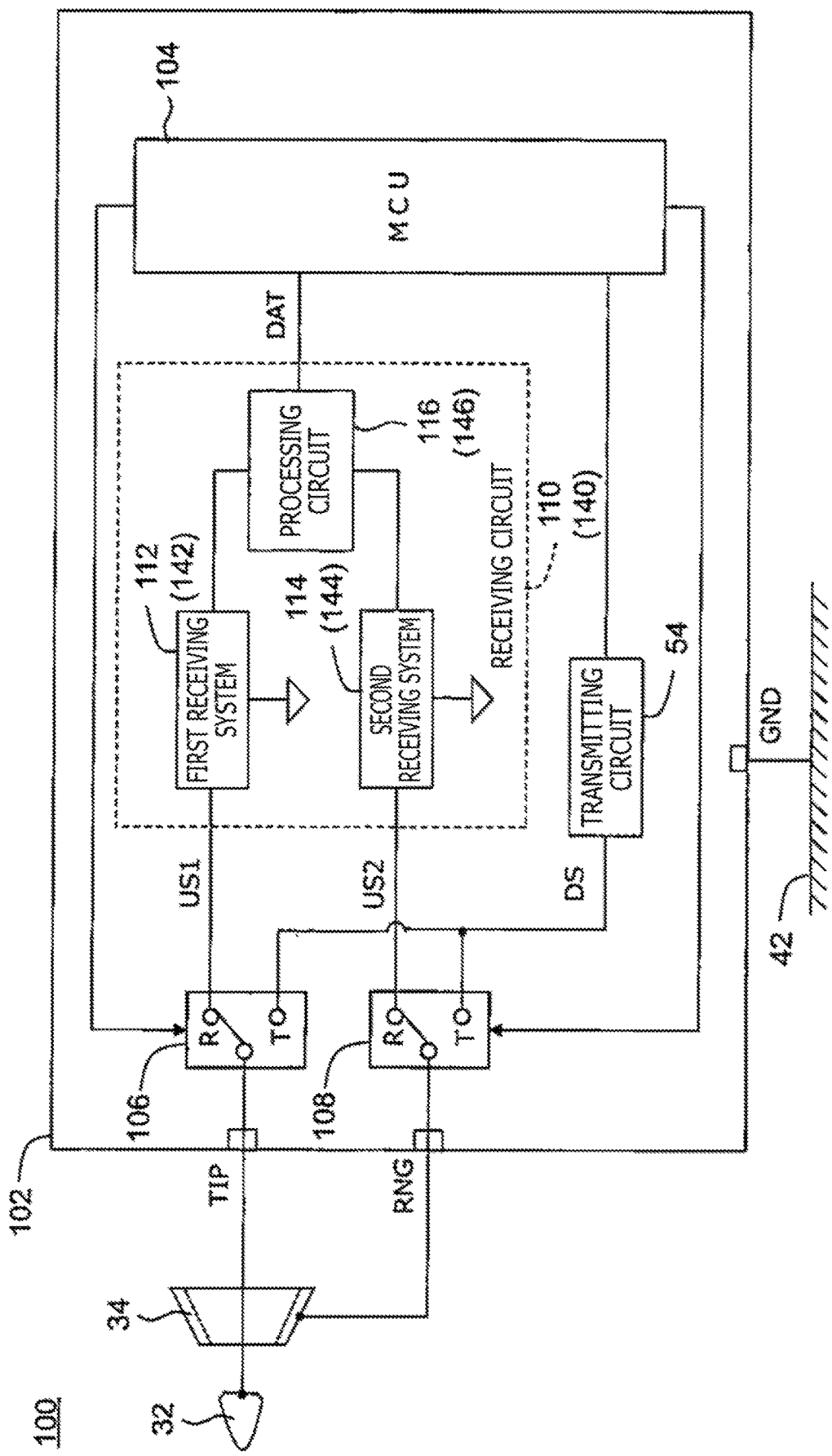
FIG. 12 is a block diagram of a circuit board included in a stylus according to a second embodiment of the present disclosure.

FIG. 12 is a block diagram of a circuit board 102 (integrated circuit) included in a stylus 100 in the second embodiment of the present disclosure. Provided on the circuit board 102 are an MCU 104 (control circuit), a first switch 106, a second switch 108, a receiving circuit 110 (or a receiving circuit 140), and a transmitting circuit 54 similar to those of the first embodiment.

The MCU 104 is a unit that performs centralized control of each part of the stylus 100. The MCU 104 is configured to be able to receive uplink signals US1 and US2 from the electronic apparatus 14 by performing desired reception control of the receiving circuit 110. In addition, the MCU 104 is configured to be able to transmit a downlink signal DS to the electronic apparatus 14 by performing desired transmission control of the transmitting circuit 54.

The first switch 106 is a switch element configured such that a common terminal is connected to one of an R-terminal and a T-terminal. The common terminal of the first switch 106 is connected to the tip electrode 32. The R-terminal of the first switch 106 is connected to a first input terminal of the receiving circuit 110. The T-terminal of the first switch 106 is connected to an output terminal of the transmitting circuit 54. The MCU 104 performs switching control of the first switch 106, to thereby selectively perform the reception of the uplink signal US1 and the transmission of the downlink signal DS.

The second switch 108 is a switch element configured such that a common terminal is connected to one of an R-terminal and a T-terminal. The common terminal of the second switch 108 is connected to the ring electrode 34. The R-terminal of the second switch 108 is connected to a second input terminal of the receiving circuit 110. The T-terminal of the second switch 108 is connected to the output terminal of the transmitting circuit 54. The MCU 104 performs switching control of the second switch 108, to thereby selectively perform the reception of the uplink signal US2 and the transmission of the downlink signal DS.

The receiving circuit 110 or 140 is a circuit that demodulates at least one of the uplink signal US1 induced in the tip electrode 32 and the uplink signal US2 induced in the ring electrode 34, and outputs data DAT after demodulation to the MCU 104. Here, a grounding terminal of the receiving circuit 110 or 140 is grounded (or ground-connected) to the casing 42 of the stylus 100.

First Example

A sample configuration of the receiving circuit 110 will first be described with reference to FIG. 13 and FIG. 14. The receiving circuit 110 in a first example includes a first receiving system 112, a second receiving system 114, and a processing circuit 116.

Figure 13:
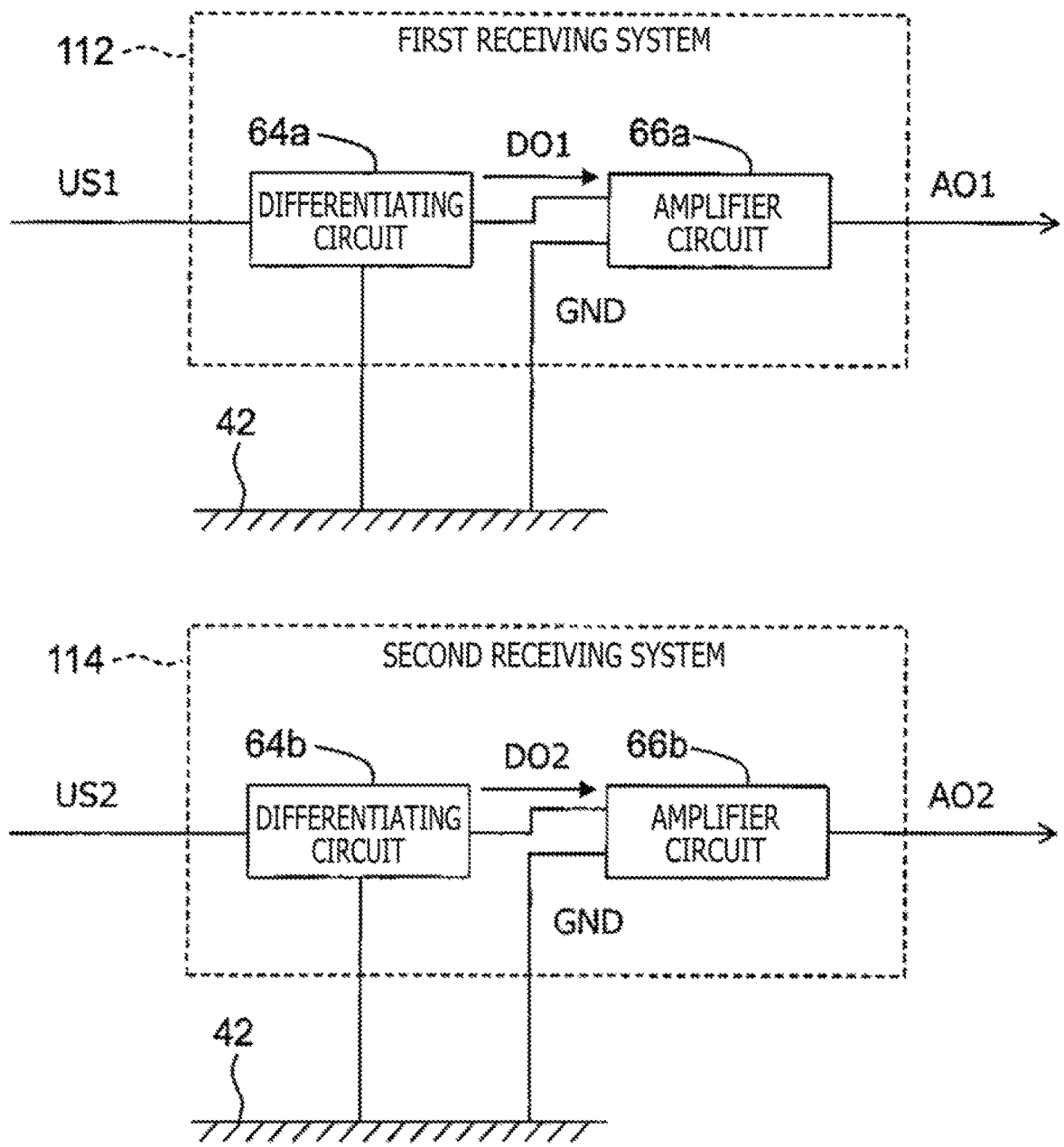
FIG. 13 is a diagram illustrating a first example of a configuration of a first receiving system and a second receiving system.

FIG. 13 is a diagram illustrating a first example of a configuration of the first receiving system 112 and the second receiving system 114. The first receiving system 112 is an analog circuit including a differentiating circuit 64a and an amplifier circuit 66a (first amplifier circuit). Similarly, the second receiving system 114 is an analog circuit including a differentiating circuit 64b and an amplifier circuit 66b (first amplifier circuit).

The differentiating circuit 64a is a circuit that generates a differential signal by differentiating the uplink signal US1 induced in the tip electrode 32. The differentiating circuit 64a includes a capacitor, a resistance element, and a buffer. The differentiating circuit 64b is a circuit that generates a differential signal by differentiating the uplink signal US2 induced in the ring electrode 34. The differentiating circuit 64b includes a capacitor, a resistance element, and a buffer. The time constant of the differentiating circuit 64a is preferably equal to the time constant of the differentiating circuit 64b, but may be different from the time constant of the differentiating circuit 64b.

The amplifier circuit 66a is a circuit that amplifies an output signal DO1 of the differentiating circuit 64a. The amplifier circuit 66a has an input terminal connected to the differentiating circuit 64a, and has a grounding terminal connected to the casing 42. The amplifier circuit 66b is a circuit that amplifies an output signal DO2 of the differentiating circuit 64b. The amplifier circuit 66b has an input terminal connected to the differentiating circuit 64b, and has a grounding terminal connected to the casing 42.

Figure 14:
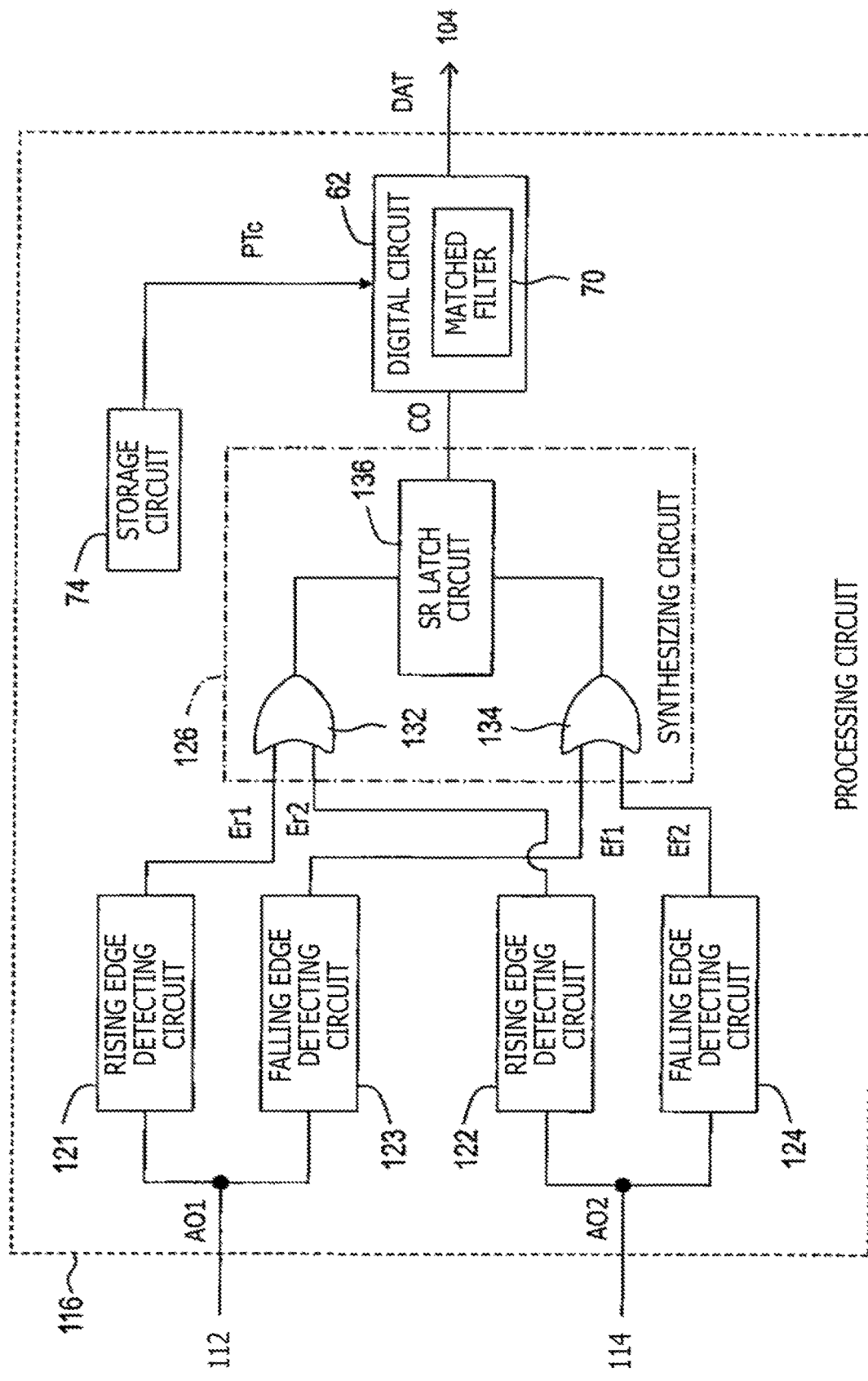
FIG. 14 is a diagram illustrating a first example of a configuration of a processing circuit.

FIG. 14 is a diagram illustrating a first example of a configuration of the processing circuit 116. The processing circuit 116 includes two rising edge detecting circuits 121 and 122, two falling edge detecting circuits 123 and 124, and a synthesizing circuit 126 in addition to a digital circuit 62 and a storage circuit 74 similar to those of the first embodiment (FIG. 6 and FIG. 7).

The rising edge detecting circuit 121 is a circuit that detects a rising edge in the output signal AO1 of the first receiving system 112, and outputs an edge signal Er1 indicating the timing of the rising edge as a result of the detection. The rising edge detecting circuit 122 is a circuit that detects a rising edge in the output signal AO2 of the second receiving system 114, and outputs an edge signal Er2 indicating the timing of the rising edge as a result of the detection.

The falling edge detecting circuit 123 is a circuit that detects a falling edge in the output signal AO1 of the first receiving system 112, and outputs an edge signal Ef1 indicating the timing of the falling edge as a result of the detection. The falling edge detecting circuit 124 is a circuit that detects a falling edge in the output signal AO2 of the second receiving system 114, and outputs an edge signal Ef2 indicating the timing of the falling edge as a result of the detection.

The synthesizing circuit 126 is a circuit that outputs a synthetic signal (binarized signal) in which the waveform of the uplink signal US is reconstructed, by synthesizing the four edge signals Er1, Er2, Ef1, and Ef2. The synthesizing circuit 126 includes two logical sum circuits 132 and 134 and an SR latch circuit 136. The logical sum circuit 132 is a circuit that outputs a logical sum of the edge signal Er1 indicating the rising edge of the output signal AO1 and the edge signal Er2 indicating the rising edge of the output signal AO2. The logical sum circuit 134 is a circuit that outputs a logical sum of the edge signal Ef1 indicating the falling edge of the output signal AO1 and the edge signal Ef2 indicating the falling edge of the output signal AO2. The SR latch circuit 136 is a latch circuit, which receives an output signal of the logical sum circuit 132 as an S-input, and receives an output signal of the logical sum circuit 134 as an R-input.

The digital circuit 62 is a circuit that detects data DAT on the basis of an output signal CO of the synthesizing circuit 126. Specifically, a matched filter 70 constituting a part of the digital circuit 62 performs correlation operation between the output signal CO successively supplied as a chip sequence and the comparison pattern PTc read from the storage circuit 74, to thereby detect the data DAT indicated by the uplink signal US.

Thus, the receiving circuit 110 in the first example (the processing circuit 116 in FIG. 14) includes: the synthesizing circuit 126 that synthesizes a first processed signal (edge signals Er1 and Ef1 in this case), which is obtained by processing the output signal AO1 (first amplified signal) of the amplifier circuit 66a, and a second processed signal (edge signals Er2 and Ef2 in this case), which is obtained by processing the output signal AO2 (second amplified signal) of the amplifier circuit 66b; and the digital circuit 62 (detecting circuit) that detects the data DAT indicated by the uplink signal US by performing correlation operation between the output signal CO (synthetic signal) of the synthesizing circuit 126 and the comparison pattern PTc corresponding to the uplink signal US. Alternatively, the synthesizing circuit 126 may synthesize the output signal AO1 of the amplifier circuit 66a and the output signal AO2 of the amplifier circuit 66b.

Second Example

A sample configuration of the receiving circuit 140 will next be described with reference to FIG. 15 and FIG. 16. The receiving circuit 140 according to a second example includes a first receiving system 142, a second receiving system 144, and a processing circuit 146.

Figure 15:
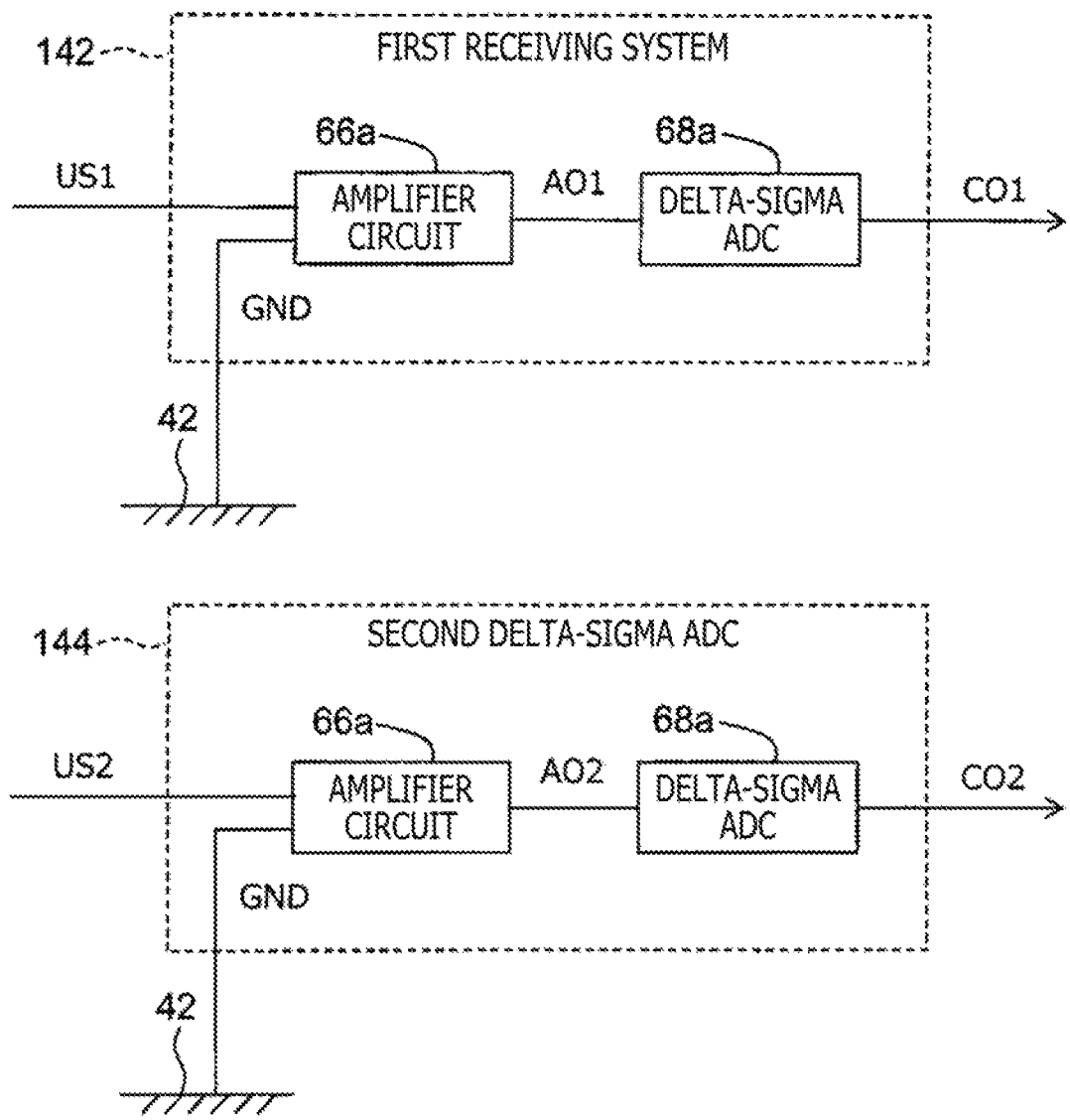
FIG. 15 is a diagram illustrating a second example of the configuration of the first receiving system and the second receiving systems.

FIG. 15 is a diagram illustrating a second example of a sample configuration of the first receiving system 142 and the second receiving system 144. As with the analog circuit 60a in FIG. 6, the first receiving system 142 is a circuit including an amplifier circuit 66a (first amplifier circuit) and a delta-sigma ADC 68a. As with the analog circuit 60b in FIG. 7, the second receiving system 144 is a circuit including an amplifier circuit 66b (first amplifier circuit) and a delta-sigma ADC 68b.

Figure 16:
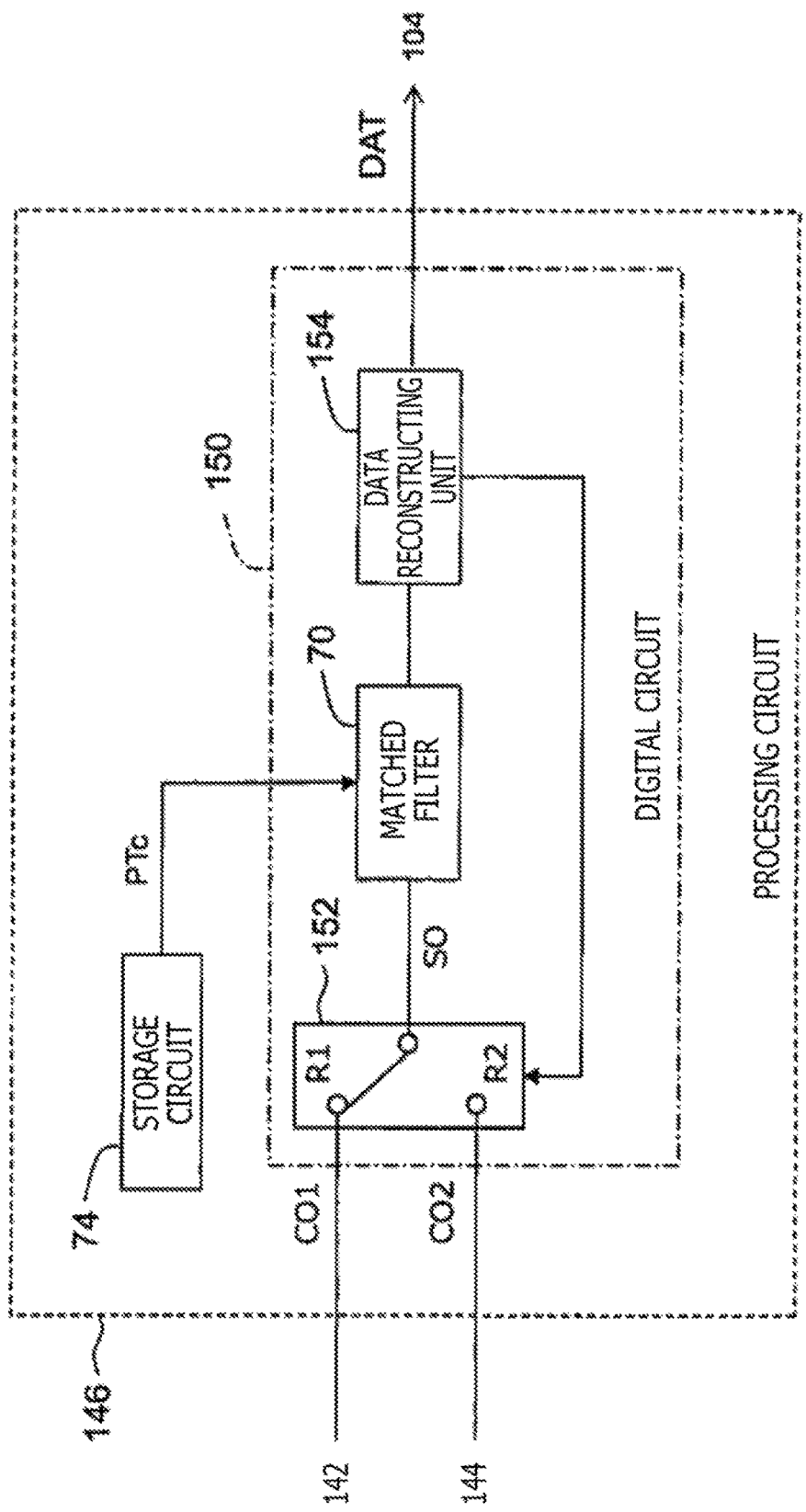
FIG. 16 is a diagram illustrating a second example of the configuration of the processing circuit.

FIG. 16 is a diagram illustrating a second example of a configuration of the processing circuit 146. The processing circuit 146 includes, in addition to the storage circuit 74 described above, a digital circuit 150 having different functions as compared with the digital circuit 62 of the first example. The digital circuit 150 is a circuit including, in addition to the matched filter 70 described above, a switch 152 and a data reconstructing unit 154.

The switch 152 is a switch element configured such that a common terminal is connected to one of an R1 terminal and an R2 terminal. The common terminal of the switch 152 is connected to the data reconstructing unit 154. The R1 terminal of the switch 152 is connected to an output terminal of the first receiving system 142. The R2 terminal of the switch 152 is connected to an output terminal of the second receiving system 144. In the following, the switch 152 is assumed to be normally connected to the R1 terminal side.

The matched filter 70 has a function of detecting a data signal corresponding to the uplink signal US by performing correlation operation between an output signal SO selectively output from the switch 152 and the comparison pattern PTc read from the storage circuit 74. In the following, the correlation operation in a case where the switch 152 selects the output signal CO1 will be referred to as "first correlation operation," and the correlation operation in a case where the switch 152 selects the output signal CO2 will be referred to as "second correlation operation."

The data reconstructing unit 154 has a function of reconstructing the data signal detected by the matched filter 70 according to a known rule, and outputting data DAT. In a case where the common terminal and the R1 terminal of the switch 152 are connected to each other, and the matched filter 70 can detect the data signal by the first correlation operation, the data reconstructing unit 154 sequentially outputs the data DAT corresponding to the data signal. When the matched filter 70 cannot newly detect the data signal by the first correlation operation, the data reconstructing unit 154 controls the switch 152 to connect the common terminal to the R2 terminal.

Then, in a case where the common terminal and the R2 terminal of the switch 152 are connected to each other, and the matched filter 70 can detect the data signal by the second correlation operation, the data reconstructing unit 154 sequentially outputs the data DAT corresponding to the data signal. The data reconstructing unit 154 may control the switch 152 so as to return the connection destination to the original connection destination, [1] when a predetermined time has passed since the switching of the switch 152, or [2] when the matched filter 70 cannot newly detect the data signal by the second correlation operation.

Thus, the receiving circuit 140 in the second example (the processing circuit 146 in FIG. 16) may include the digital circuit 150 (detecting circuit) that detects the data DAT indicated by the uplink signal US by the first correlation operation between a first processed signal (output signal CO1 in this case), which is obtained by processing the output signal AO1 (first amplified signal) of the amplifier circuit 66a, and the comparison pattern PTc corresponding to the uplink signal US1; or by the second correlation operation between a second processed signal (output signal CO2 in this case), which is obtained by processing the output signal AO2 of the amplifier circuit 66b, and the comparison pattern PTc corresponding to the uplink signal US2. Alternatively, the digital circuit 150 may perform the first correlation operation between the output signal AO1 of the amplifier circuit 66a and the comparison pattern PTc and the second correlation operation between the output signal AO2 of the amplifier circuit 66b and the comparison pattern PTc.

Effects of Second Embodiment

In the embodiment described above, the stylus 100 includes: the casing 42 used as providing the reference potential; the tip electrode 32 (first electrode); the ring electrode 34 (second electrode) different from the tip electrode 32; the receiving circuit 110 or 140 configured to receive a transmission signal transmitted from the electronic apparatus 14 via each of electrostatic couplings formed between the tip electrode 32 and the sensor electrode group 18 and between the ring electrode 34 and the sensor electrode group 18, the circuit including the amplifier circuit 66a (first amplifier circuit) grounded to the casing 42 and configured to amplify a signal induced in the tip electrode 32, and the amplifier circuit 66b (second amplifier circuit) different from the amplifier circuit 66a, the amplifier circuit 66b (second amplifier circuit) being grounded to the casing 42 and configured to amplify a signal induced in the ring electrode 34; and the MCU 104 (control circuit) configured to perform reception control of the receiving circuit 110 or 140.

When the human body BD of the user, for example, touches the touch surface 12 of the electronic apparatus 14, an electrostatic coupling may be formed between the human body BD and the sensor electrode group 18, and the uplink signal US from the electronic apparatus 14 may be induced in the contacting portion of the human body BD. According to the present disclosure, the amplifier circuit 66a configured to amplify the signal induced in the tip electrode 32 and the amplifier circuit 66b configured to amplify the signal induced in the ring electrode 34 are provided within the receiving circuit 110 or 140 so that the transmission signal may be inputted respectively from the two electrodes having different relative positions and attitude relationships with respect to the contacting portion of the human body BD.

Because the amplifier circuits 66a and 66b are grounded to the casing 42 which provides the common GND potential, the effect of fluctuations of the GND potential caused by the signal induced in the human body BD on each of the two amplifier circuits may be offset or shifted from each other spatially or temporally. Thus, even when a subtle balance change between the electrode of the stylus 100 and the contacting portion of the human body BD causes one of the two amplifier circuits to locally or suddenly malfunction, there is an increased possibility that the other one of the two amplifier circuits functions properly as intended. Thus, it is possible to suppress the possibility that the signal induced in the electrode temporarily becomes undetectable due to the fluctuations of the GND potential.

The tip electrode 32 and the ring electrode 34 may be arranged at the end side of the casing 42, and have shapes different from each other. The tip electrode 32 and the ring electrode 34 may be arranged so as to be separated from each other in the direction of the pen axis. Technical effects and benefits similar to those of the first embodiment can therefore be obtained (e.g., suppression of the possibility that the signal induced in the stylus electrodes temporarily becomes undetectable due to that both signals at the two electrodes becoming undetectable at the same time).

Modifications

The present disclosure is not limited to the foregoing first and second embodiments, and may be readily modified without departing from the spirit of the present disclosure. Alternatively, various configurations may be readily combined with each other where no technical contradiction occurs.

The "first and second receiving circuits" in the first embodiment may be reworded as the "first and second receiving channels," respectively, or may be reworded as the "first and second detecting circuits," respectively.

The stylus 16 in the first embodiment includes two electrodes and two receiving circuits. However, the combination of the numbers of electrodes and receiving circuits is not limited to this particular example. For example, three or more electrode and three or more receiving circuits may be provided, and all or only a part thereof may be used. Similarly, the combination of the numbers of electrodes and receiving systems in the second embodiment may be changed as appropriate.

The second receiving circuit 52 in the first embodiment has a configuration similar to that of the first receiving circuit 50. However, the first receiving circuit 50 and the second receiving circuit 52 may have configurations different from each other. For example, the first receiving circuit 50 may include a converting circuit of the delta-sigma type (see FIG. 7), while the second receiving circuit 52 may include a converting circuit of the edge extraction type (see FIG. 14). Similarly, the circuit configurations of the receiving systems in the second embodiment may be changed as appropriate. Optimization of operation, such as improvement in reception sensitivity and reduction in power consumption, may be achieved by selecting and using a plurality of receiving circuits (or receiving systems) having different circuit characteristics.

The stylus 16 in the first embodiment receives one type of uplink signal US. However, the stylus 16 may be configured to be able to receive multiple types of uplink signals US simultaneously via a plurality of receiving circuits. As long as the stylus 16 is aware of the frequency bands or the types of code patterns of the uplink signals US, the stylus 16 may perform, in a plurality of detecting circuits, correlation operation using respective corresponding comparison patterns PTc.

Figure 17A:
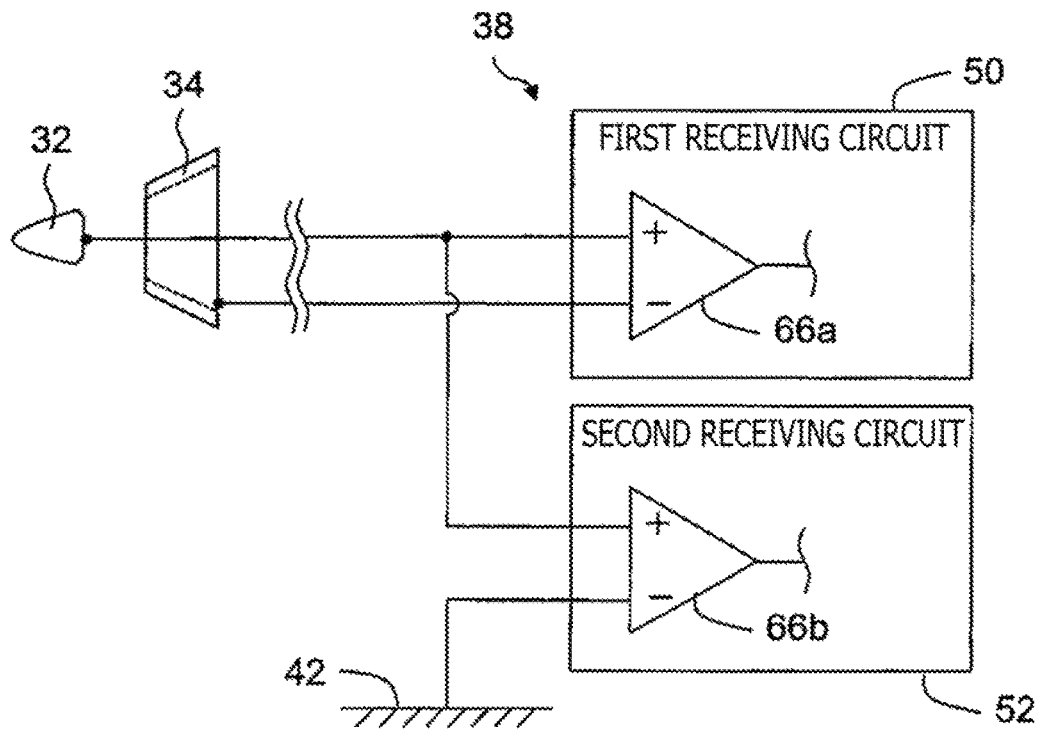
FIGS. 17A and 17B are diagrams illustrating another example of connections between electrodes and receiving circuits.
Figure 17B:
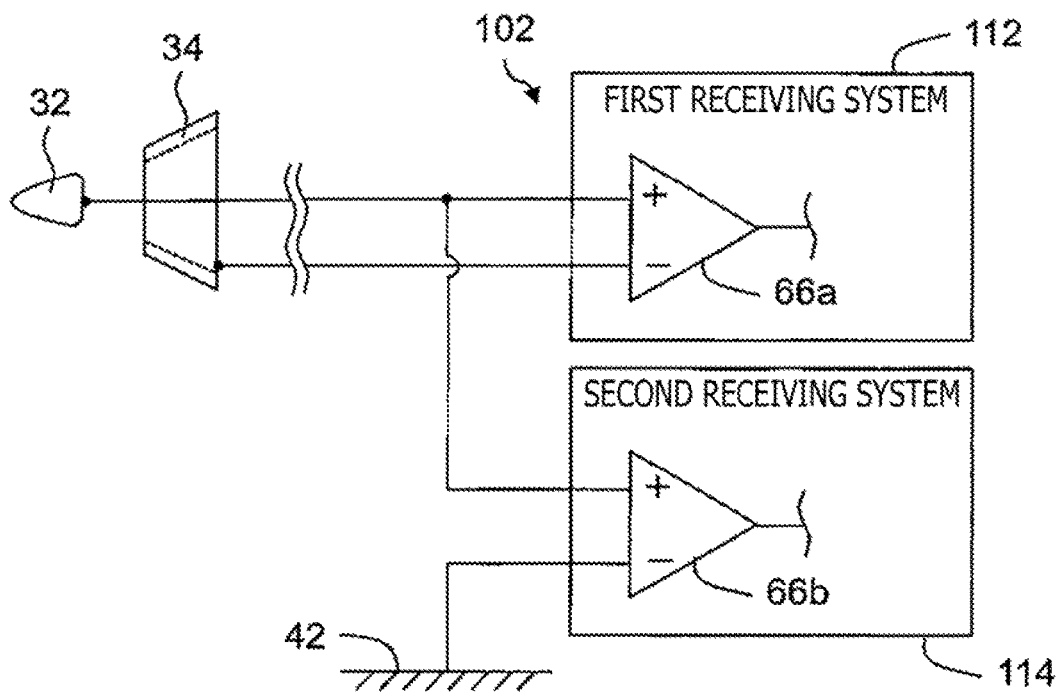
Figure 18A:
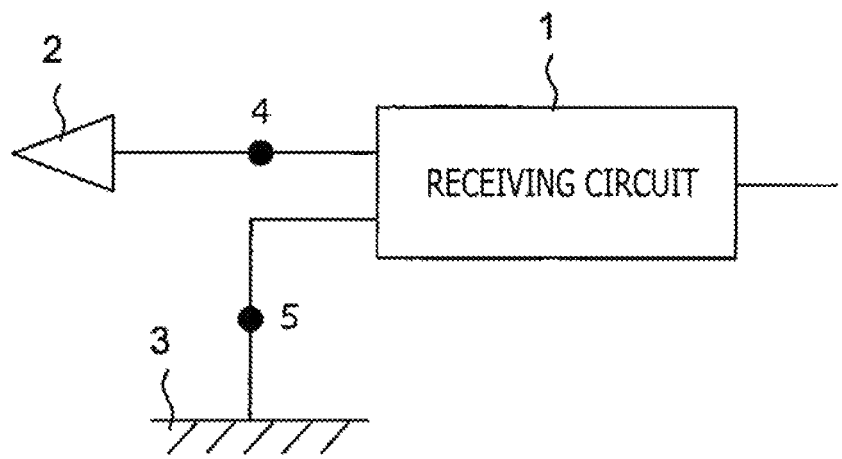
FIGS. 18A and 18B are diagrams schematically illustrating the temporarily undetectable state of an uplink signal.
Figure 18B:
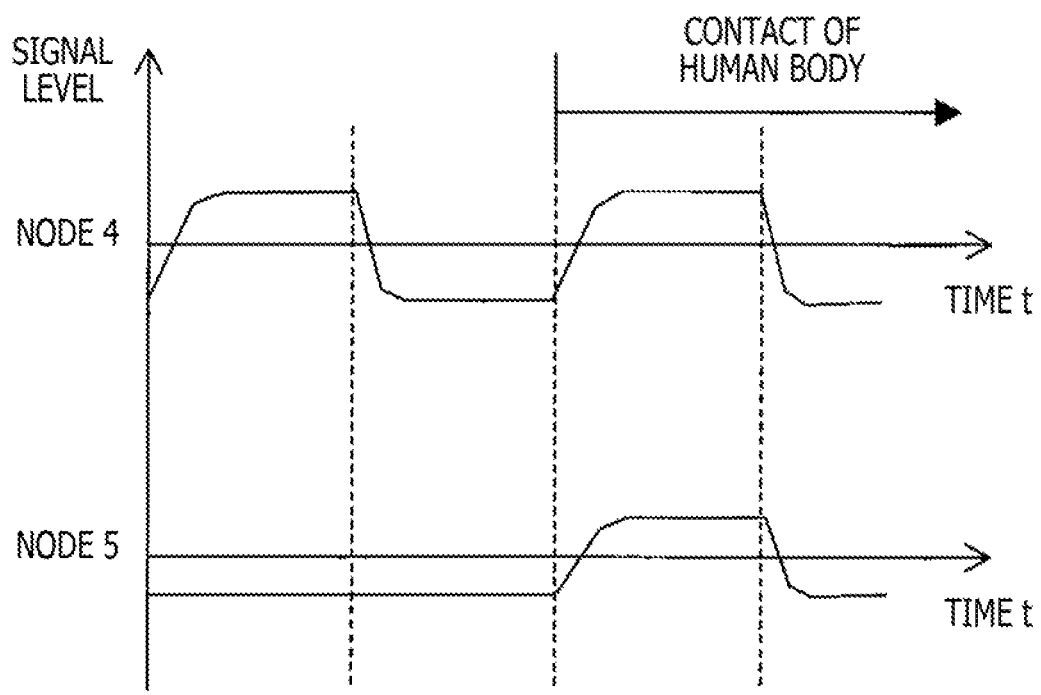

As illustrated in FIGS. 17A and 17B, the circuit board 38 or 102 may be configured to be able to receive the induced signals from the two electrodes by differential amplifier circuits. FIG. 17A corresponds to a partial diagram in the first embodiment, and FIG. 17B corresponds to a partial diagram in the second embodiment. In the examples of FIGS. 17A and 17B, the tip electrode 32 is connected to a positive side input terminal of the amplifier circuit 66*a*, and the ring electrode 34 is connected to a negative side input terminal of the amplifier circuit 66*a*. The tip electrode 32 is connected to a positive side input terminal of the amplifier circuit 66*b*, and the casing 42 is connected to a negative side input terminal of the amplifier circuit 66*b*.

The invention claimed is:

1. A stylus used in conjunction with an electronic apparatus having a capacitance type touch sensor including a sensor electrode group disposed in a planar form, the stylus comprising:
    a casing used to provide a reference potential;
    a first electrode;
    a second electrode different from the first electrode;
    a first amplifier circuit grounded to the casing and configured to receive a transmission signal transmitted from the electronic apparatus via an electrostatic coupling formed between the first electrode and the sensor electrode group;
    a second amplifier circuit different from the first amplifier circuit and grounded to the casing and configured to receive the transmission signal transmitted from the electronic apparatus via an electrostatic coupling formed between the second electrode and the sensor electrode group; and
    a control circuit configured to perform reception control of the first amplifier circuit and the second amplifier circuit,
    wherein
    the first amplifier circuit includes a first detecting circuit configured to detect first data indicated by the transmission signal, by performing correlation operation between a first amplified signal output from the first amplifier circuit or a first processed signal obtained by processing the first amplified signal and a comparison pattern corresponding to the transmission signal,
    the second amplifier circuit includes a second detecting circuit configured to detect second data indicated by the transmission signal, by performing correlation operation between a second amplified signal output from the second amplifier circuit or a second processed signal obtained by processing the second amplified signal and the comparison pattern corresponding to the transmission signal, and
    the control circuit obtains the first data from the first amplifier circuit, and obtains the second data from the second amplifier circuit.

2. The stylus according to claim 1, wherein the control circuit
    performs data processing using the first data while the control circuit is able to obtain the first data from the first amplifier circuit, and
    performs data processing using the second data obtained from the second amplifier circuit while the control circuit is not able to obtain the first data from the first amplifier circuit.

3. The stylus according to claim 1, wherein the first electrode and the second electrode are arranged at an end side of the casing, and have shapes different from each other.

4. The stylus according to claim 1, wherein the first electrode and the second electrode are arranged so as to be separated from each other in a direction of a pen axis.

5. A stylus used in conjunction with an electronic apparatus having a capacitance type touch sensor including a sensor electrode group disposed in a planar form, the stylus comprising:
    a casing used to provide a reference potential;
    a first electrode;
    a second electrode different from the first electrode;
    an amplifier circuit configured to receive a transmission signal transmitted from the electronic apparatus via each of electrostatic couplings formed between the first electrode and the sensor electrode group and between the second electrode and the sensor electrode group, the amplifier circuit including:
        a first amplifier circuit grounded to the casing and configured to amplify a signal induced in the first electrode, and
        a second amplifier circuit different from the first amplifier circuit, the second amplifier circuit being grounded to the casing and configured to amplify a signal induced in the second electrode; and
    a control circuit configured to perform reception control of the amplifier circuit,
    wherein
    the amplifier circuit includes
        a synthesizing circuit configured to synthesize a first amplified signal output from the first amplifier circuit and a second amplified signal output from the second amplifier circuit, or synthesize a first processed signal obtained by processing the first amplified signal and a second processed signal obtained by processing the second amplified signal, and
        a detecting circuit configured to detect data indicated by the transmission signal by performing correlation operation between a synthetic signal synthesized by the synthesizing circuit and a comparison pattern corresponding to the transmission signal, and
    the control circuit performs data processing using the data obtained from the amplifier circuit.

6. The stylus according to claim 5, wherein
    the amplifier circuit includes a detecting circuit configured to detect data indicated by the transmission signal by
        performing a first correlation operation between a first amplified signal output from the first amplifier circuit or a first processed signal obtained by processing the first amplified signal and a comparison pattern corresponding to the transmission signal, or performing a second correlation operation between a second amplified signal output from the second amplifier circuit or a second processed signal obtained by processing the second amplified signal and the comparison pattern corresponding to the transmission signal, and the control circuit performs data processing using the data obtained from the amplifier circuit.

7. The stylus according to claim 5, wherein the first electrode and the second electrode are arranged at an end side of the casing, and have shapes different from each other.

8. The stylus according to claim 5, wherein the first electrode and the second electrode are arranged so as to be separated from each other in a direction of a pen axis.

9. An integrated circuit used in a stylus, the stylus including a casing used to provide a reference potential, a first electrode, and a second electrode different from the first electrode, wherein the stylus is for use in conjunction with an electronic apparatus having a capacitance type touch sensor including a sensor electrode group disposed in a planar form, the integrated circuit comprising:
 a first amplifier circuit grounded to the casing and configured to receive a transmission signal transmitted from the electronic apparatus via an electrostatic coupling formed between the first electrode and the sensor electrode group;
 a second amplifier circuit different from the first amplifier circuit and grounded to the casing and configured to receive the transmission signal transmitted from the electronic apparatus via an electrostatic coupling formed between the second electrode and the sensor electrode group; and
 a control circuit configured to perform reception control of the first amplifier circuit and the second amplifier circuit,
 wherein
 the first amplifier circuit includes a first detecting circuit configured to detect first data indicated by the transmission signal, by performing correlation operation between a first amplified signal output from the first amplifier circuit or a first processed signal obtained by processing the first amplified signal and a comparison pattern corresponding to the transmission signal,
 the second amplifier circuit includes a second detecting circuit configured to detect second data indicated by the transmission signal, by performing correlation operation between a second amplified signal output from the second amplifier circuit or a second processed signal obtained by processing the second amplified signal and the comparison pattern corresponding to the transmission signal, and
 the control circuit obtains the first data from the first amplifier circuit, and obtains the second data from the second amplifier circuit.

10. An integrated circuit used in a stylus, the stylus including a casing used to provide a reference potential, a first electrode, and a second electrode different from the first electrode, wherein the stylus is for use in conjunction with an electronic apparatus having a capacitance type touch sensor including a sensor electrode group disposed in a planar form, the integrated circuit comprising:
 an amplifier circuit configured to receive a transmission signal transmitted from the electronic apparatus via each of electrostatic couplings formed between the first electrode and the sensor electrode group and between the second electrode and the sensor electrode group, the amplifier circuit including:
  a first amplifier circuit grounded to the casing and configured to amplify a signal induced in the first electrode; and
  a second amplifier circuit different from the first amplifier circuit, the second amplifier circuit being grounded to the casing and configured to amplify a signal induced in the second electrode; and
 a control circuit configured to perform reception control of the amplifier circuit,
 wherein
 the amplifier circuit includes
  a synthesizing circuit configured to synthesize a first amplified signal output from the first amplifier circuit and a second amplified signal output from the second amplifier circuit, or synthesize a first processed signal obtained by processing the first amplified signal and a second processed signal obtained by processing the second amplified signal, and
  a detecting circuit configured to detect data indicated by the transmission signal by performing correlation operation between a synthetic signal synthesized by the synthesizing circuit and a comparison pattern corresponding to the transmission signal, and
 the control circuit performs data processing using the data obtained from the amplifier circuit.

* * * * *